US011375552B2

(12) United States Patent
Lei et al.

(10) Patent No.: US 11,375,552 B2
(45) Date of Patent: Jun. 28, 2022

(54) ENHANCED ON-DEMAND SYSTEM INFORMATION

(71) Applicant: QUALCOMM Incorporated, San Diego, CA (US)

(72) Inventors: Jing Lei, San Diego, CA (US); Yi Huang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/127,529

(22) Filed: Dec. 18, 2020

(65) Prior Publication Data

US 2021/0266970 A1 Aug. 26, 2021

Related U.S. Application Data

(60) Provisional application No. 62/982,009, filed on Feb. 26, 2020.

(51) Int. Cl.
*H04W 74/08* (2009.01)
*H04W 74/00* (2009.01)
(Continued)

(52) U.S. Cl.
CPC ....... *H04W 74/0833* (2013.01); *H04L 1/1812* (2013.01); *H04W 48/12* (2013.01);
(Continued)

(58) Field of Classification Search
CPC ............. H04W 74/0833; H04W 48/12; H04W 72/042; H04W 72/1289; H04W 74/006;
(Continued)

(56) References Cited

U.S. PATENT DOCUMENTS

2017/0251500 A1 8/2017 Agiwal et al.
2017/0325157 A1 11/2017 Ly et al.
(Continued)

FOREIGN PATENT DOCUMENTS

WO 2018084669 A1 5/2018

OTHER PUBLICATIONS

Intel Corporation: "Discussion on Procedure for 2-Step RACH", 3GPP TSG RAN WG1 #97, 3GPP Draft; R1 -1906780 Intel Procedure, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019, pp. 1-7, May 13, 2019 (May 13, 2019), XP051728231, Retrieved from the Internet: URL: http://www.3gpp.org/ftp/Meetings%5F3GPP%5FSYNC/RAN1/Docs/R1%2D1906780%2Ezip [retrieved on May 13, 2019] paragraph 4.
(Continued)

*Primary Examiner* — Kyaw Z Soe
(74) *Attorney, Agent, or Firm* — Qualcomm Incorporated

(57) ABSTRACT

Various aspects of the present disclosure generally relate to wireless communication. In some aspects, a user equipment (UE) may receive an indication of scheduling information for dedicated on-demand system information (SI) corresponding to a specified UE category, wherein the indication is carried in at least one of: a minimum system information (MSI) communication, a radio resource control (RRC) message, a response message of a two-step random access channel (RACH) procedure, a random access response (RAR) message of a four-step RACH procedure, a contention resolution message of a four-step RACH procedure, a message type flag indicating the transmission of the dedicated on-demand SI, or a combination thereof; transmit, to the base station, an on-demand SI request based at least in part on the scheduling information and the UE category; and (Continued)

receive one or more on-demand system information blocks. Numerous other aspects are provided.

30 Claims, 9 Drawing Sheets

(51) Int. Cl.
*H04W 72/04* (2009.01)
*H04L 1/18* (2006.01)
*H04W 48/12* (2009.01)
*H04W 72/12* (2009.01)
*H04W 76/27* (2018.01)

(52) U.S. Cl.
CPC ..... *H04W 72/042* (2013.01); *H04W 72/1289* (2013.01); *H04W 74/006* (2013.01); *H04W 76/27* (2018.02)

(58) Field of Classification Search
CPC ....... H04W 76/27; H04W 48/14; H04W 8/22; H04L 1/1812
See application file for complete search history.

(56) References Cited

U.S. PATENT DOCUMENTS

| | | |
|---|---|---|
| 2018/0199267 A1 | 7/2018 | Lin et al. |
| 2018/0270855 A1 | 9/2018 | Loehr et al. |
| 2021/0251016 A1* | 8/2021 | Xiong ................ H04W 74/008 |
| 2021/0266970 A1* | 8/2021 | Lei .................... H04W 74/0833 |

OTHER PUBLICATIONS

International Search Report and Written Opinion—PCT/US2020/067623—ISA/EPO—dated Apr. 30, 2021.

* cited by examiner

ENHANCED ON-DEMAND SYSTEM INFORMATION

CROSS-REFERENCE TO RELATED APPLICATION

This Patent Application claims priority to U.S. Provisional Patent Application No. 62/982,009, filed on Feb. 26, 2020, entitled "ENHANCED ON-DEMAND SYSTEM INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for enhanced on-demand system information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station, an indication of scheduling information for dedicated on-demand system information (SI), wherein the dedicated on-demand SI comprises information corresponding to a specified UE category, wherein the indication is carried in at least one of: a minimum system information (MSI) communication, a radio resource control (RRC) message, a response message of a two-step random access channel (RACH) procedure, a random access response (RAR) message of a four-step RACH procedure, a contention resolution message of a four-step RACH procedure, a message type flag indicating a transmission of the dedicated on-demand SI, or a combination thereof; transmitting, to the base station, an on-demand SI request based at least in part on the scheduling information and the UE category; and receiving, from the base station and based at least in part on the on-demand SI request, one or more on-demand system information blocks (SIBs) of a set of dedicated on-demand SIBS.

In some aspects, a method of wireless communication, performed by a base station, may include transmitting, to a UE, an indication of scheduling information for dedicated on-demand SI, wherein the dedicated on-demand SI comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof; receiving, from the UE, an on-demand SI request based at least in part on the scheduling information; and transmitting, to the UE and based at least in part on the on-demand SI request, one or more on-demand SIBs of a set of dedicated on-demand Ms.

In some aspects, a UE for wireless communication may include a memory and one or more processors operatively coupled to the memory. The memory and the one or more processors may be configured to receive, from a base station, an indication of scheduling information for dedicated on-demand SI, wherein the dedicated on-demand SI comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof; transmit, to the base station, an on-demand SI request based at least in part on the scheduling information and the UE category; and receive, from the base station and based at least in part on the on-demand SI request, one or more on-demand SIBs of a set of dedicated on-demand SIBs.

In some aspects, a base station for wireless communication may include a memory and one or more processors operatively coupled to the memory. The memory and the one or more processors may be configured to transmit, to a UE, an indication of scheduling information for dedicated on-demand SI, wherein the dedicated on-demand SI comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof; receive, from the UE, an on-demand SI request based at least in part on the scheduling information; and transmit, to the UE and based at least in part on the on-demand SI request, one or more on-demand SIBs of a set of dedicated on-demand SIBS.

In some aspects, a non-transitory computer-readable medium may store one or more instructions for wireless communication. The one or more instructions, when executed by one or more processors of a UE, may cause the one or more processors to receive, from a base station, an indication of scheduling information for dedicated on-demand SI, wherein the dedicated on-demand system information comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof; transmit, to the base station, an on-demand SI request based at least in part on the scheduling information and the UE category; and receive, from the base station and based at least in part on the on-demand SI request, one or more on-demand SIBs of a set of dedicated on-demand SIBs.

In some aspects, a non-transitory computer-readable medium may store one or more instructions for wireless communication. The one or more instructions, when executed by one or more processors of a base station, may cause the one or more processors to transmit, to a UE, an indication of scheduling information for dedicated on-demand SI, wherein the dedicated on-demand system information comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof; receive, from the UE, an on-demand SI request based at least in part on the scheduling information; and transmit, to the UE and based at least in part on the on-demand SI request, one or more on-demand SIBs of a set of dedicated on-demand SIBs.

In some aspects, an apparatus for wireless communication may include means for receiving, from a base station, an indication of scheduling information for dedicated on-demand SI, wherein the dedicated on-demand system information comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof; means for transmitting, to the base station, an on-demand SI request based at least in part on the scheduling information and the UE category; and means for receiving, from the base station and based at least in part on the on-demand SI request, one or more on-demand SIBs of a set of dedicated on-demand SIBs.

In some aspects, an apparatus for wireless communication may include means for transmitting, to a UE, an indication of scheduling information for dedicated on-demand SI, wherein the dedicated on-demand system information comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof; means for receiving, from the UE, an on-demand SI request based at least in part on the scheduling information; and means for transmitting, to the UE and based at least in part on the on-demand SI request, one or more on-demand SIBs of a set of dedicated on-demand SIBS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
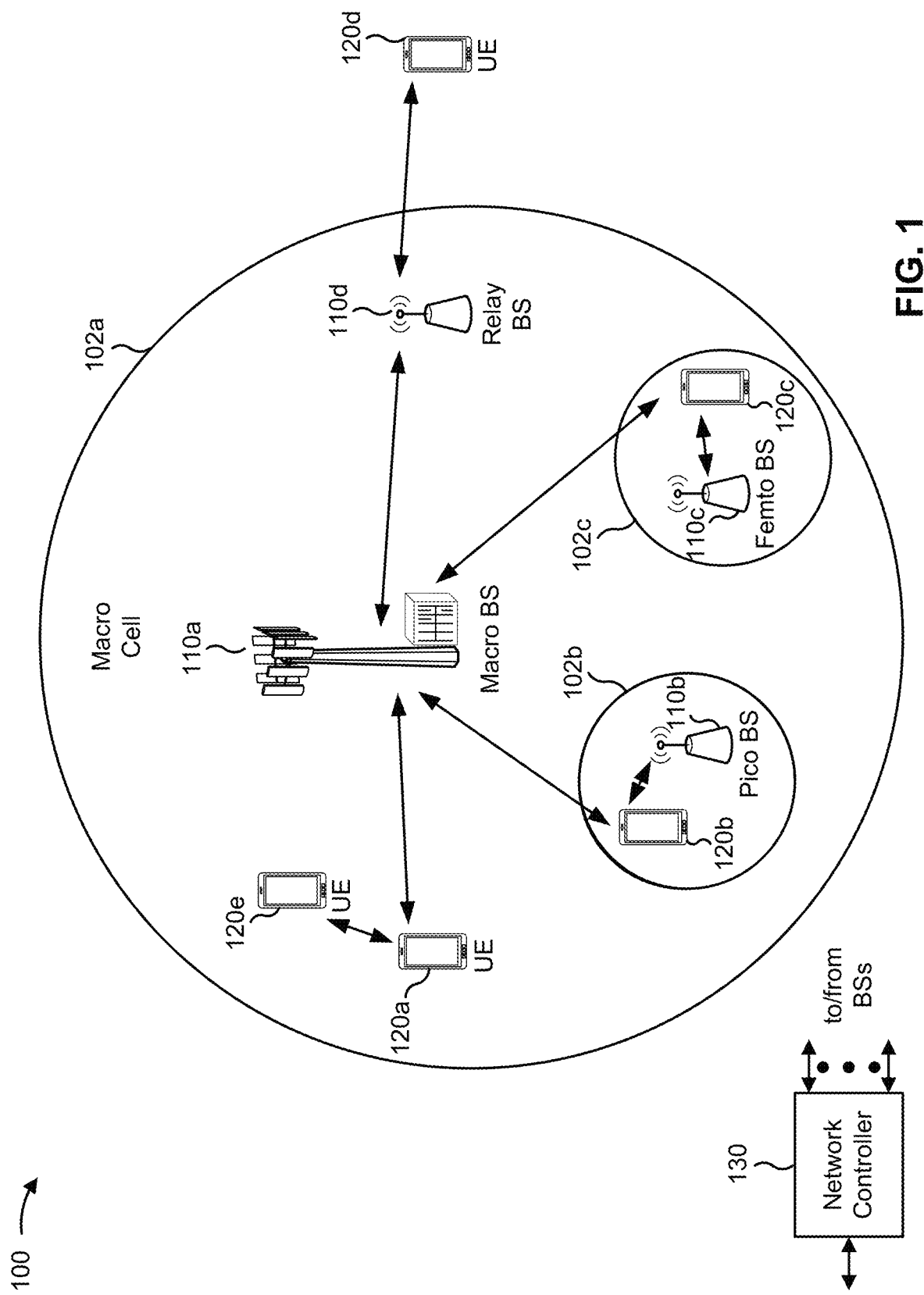
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
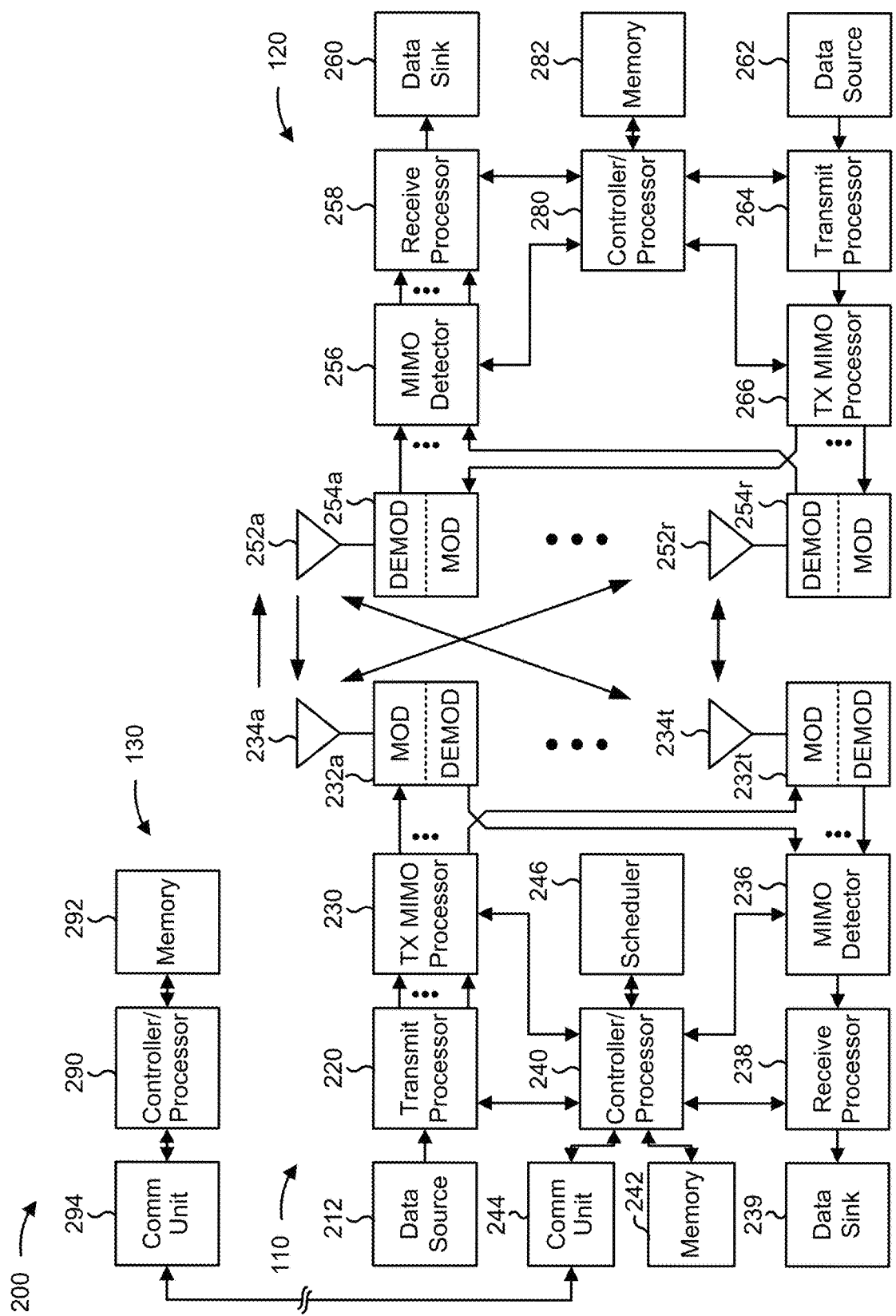
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with enhanced on-demand system information, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 800 of FIG. 8, process 900 of FIG. 9, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving, from a base station, an indication of scheduling information for dedicated on-demand system information (SI), wherein the dedicated on-demand system information comprises information corresponding to a specified UE category, wherein the indication is carried in at least one of: a minimum system information (MSI) communication, a radio resource control (RRC) message, a response message of a two-step random access channel (RACH) procedure, a random access response (RAR) message of a four-step RACH procedure, a contention resolution message of a four-step RACH procedure, or a combination thereof, means for transmitting, to the base station, an on-demand SI request based at least in part on the scheduling information, means for receiving, from the base station and based at least in part on the on-demand SI request, one or more on-demand system information blocks (SIBs) of a set of dedicated on-demand SIBs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a user equipment (UE), an indication of scheduling information for dedicated on-demand system information (SI), wherein the dedicated on-demand system information comprises information corresponding to a specified UE category, wherein the indication is carried in at least one of: a minimum system information (MSI) communication, a radio resource control (RRC) message, a response message of a two-step random access channel (RACH) procedure, a random access response (RAR) message of a four-step RACH procedure, a contention resolution message of a four-step RACH procedure, or a combination thereof, means for receiving, from the UE, an on-demand SI request based at least in part on the scheduling information, means for transmitting, to the UE and based at least in part on the on-demand SI request, one or more on-demand system information blocks (SIBs) of a set of dedicated on-demand SIBs, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
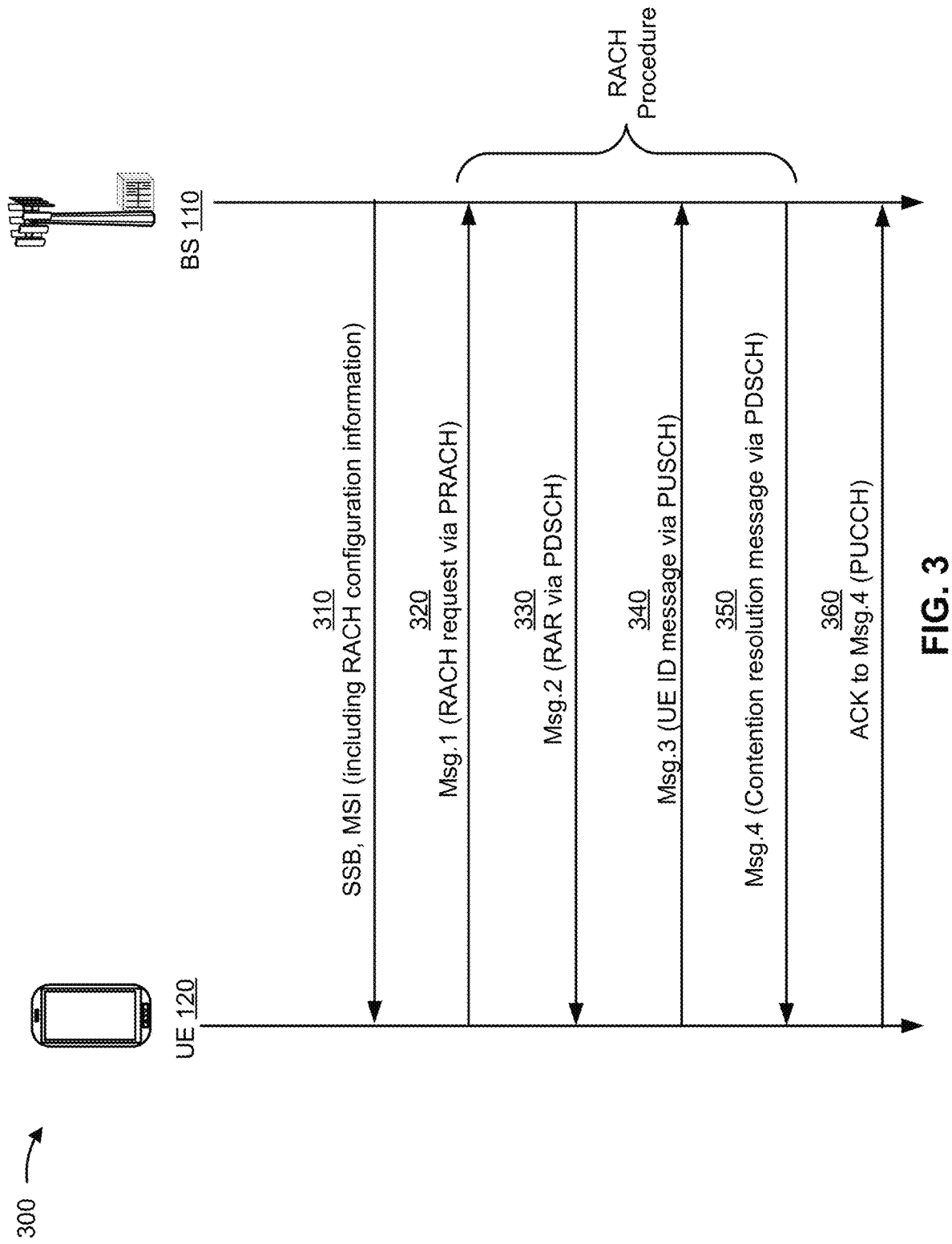
FIG. 3 is a diagram illustrating an example of a call flow for configuring an uplink bandwidth part for a four-step random access channel (RACH) procedure, in accordance with various aspects of the present disclosure.

FIG. 3 is a diagram illustrating an example 300 of a call flow for configuring an uplink bandwidth part for a four-step random access channel (RACH) procedure, in accordance with various aspects of the present disclosure.

As shown in FIG. 3, BS 110 and UE 120 exchange communications, including communications of a RACH procedure, based at least in part on an initial activity event occurring with UE 120. An initial activity may include UE 120 powering on, UE 120 entering a coverage area of BS 110, and/or the like. According to some aspects described herein, UE 120 and BS 110 may utilize an initial active uplink bandwidth part to perform the RACH procedure of FIG. 3. From the RACH procedure, according to some aspects herein, an uplink physical resource block (PRB) grid may be established for communication between UE 120 and BS 110. As such, the initial active uplink bandwidth part may enable UE 120 to save power resources (rather than transmitting across a wider bandwidth), ensure that UE 120 has the bandwidth capability to communicate with BS 110 (as some types of UE 120 may not have broad bandwidth capabilities), and enable BS 110 to balance the load of the bandwidth parts of the bandwidth used for communication with UE 120 (e.g., by evenly distributing communications with UEs across uplink bandwidth parts of an uplink bandwidth).

As shown by reference number 310, BS 110 transmits, and UE 120 receives, one or more synchronization signal blocks (SSBs) and some minimum system information (MSI), which includes RACH configuration information, to UE 120. For example, the MSI may include communication information for UE 120 to use to communicate with BS 110. The RACH configuration information, according to some aspects described herein, may include information associated with an initial active uplink bandwidth part for the RACH procedure of FIG. 3 to enable UE 120 and BS 110 to establish a communication link. For example, the RACH configuration information may indicate or provide instructions for identifying a PRB frequency location of the initial uplink activity bandwidth part, a bandwidth of the initial uplink activity bandwidth part, and/or a numerology of the initial uplink activity bandwidth part. Using the PRB frequency location, the bandwidth, and/or the numerology of the initial uplink activity bandwidth part, an uplink PRB grid may be established for communication between UE 120 and BS 110.

As shown in FIG. 3, a RACH procedure is performed (as illustrated by reference numbers 320-350) using an initial active uplink bandwidth part. In the RACH procedure of FIG. 3, and as shown by reference number 320, using information from the MSI, UE 120 sends Msg.1 with a RACH request via a physical random access channel (PRACH). As shown by reference number 330, BS 110 may reply to Msg.1 with Msg.2 (random access response (RAR)) via the PDSCH. As shown by reference number 340, UE 120 sends Msg.3 (a UE identification message) via the PUSCH. As shown by reference number 350, BS 110 sends Msg.4 (contention resolution message) via the PDSCH. After the RACH procedure, as shown by reference number 360, UE 120 may send an acknowledgement indicating that UE 120 is ready to communicate with BS 110 via an uplink PRB grid (which is used in the communication link between UE 120 and BS 110).

As indicated above, FIG. 3 is provided as an example. Other examples may differ from what is described with respect to FIG. 3.

Figure 4:
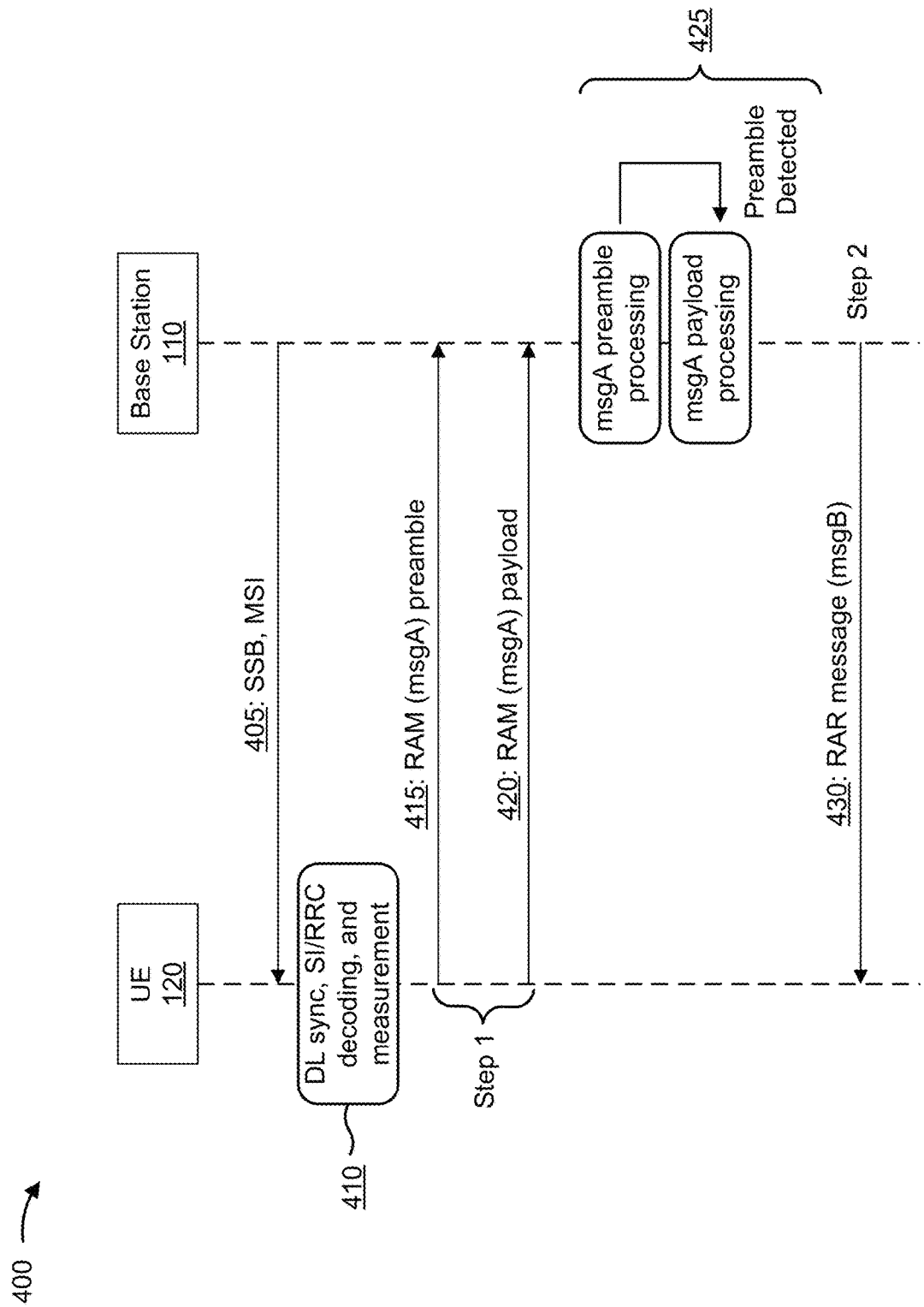
FIG. 4 is a diagram illustrating an example of a call flow for configuring an uplink bandwidth part for a two-step RACH procedure, in accordance with various aspects of the present disclosure.

FIG. 4 is a diagram illustrating an example 400 of a call flow for configuring an uplink bandwidth part for a two-step RACH procedure, in accordance with various aspects of the present disclosure.

As shown in FIG. 4, a base station 110 and a UE 120 may communicate with one another to perform the two-step RACH procedure.

As shown by reference number 405, the base station 110 may transmit, and the UE 120 may receive, one or more SSBs and/or MSI that includes RACH configuration information. The MSI may include, for example, one or more SIBs. The SSBs, MSI, and/or the like may include information related to one or more RACH occasion (RO) configurations, such as information related to one or more ordered preamble resources. As shown by reference number 410, the UE 120 may perform downlink (DL) synchronization (e.g., using one or more SSBs), decode system information (SI) and/or RRC configuration information included in one or more SIBs, perform one or more measurements of reference signals (RSs), and/or the like. Based at least in part on performing the second operation 410, the UE 120 may determine one or more parameters for transmitting a random access message (RAM) in the two-step RACH procedure. For example, the UE 120 may determine one or more physical random access channel (PRACH) transmission parameters to be used to transmit the RAM, may determine one or more parameters for generating a preamble of the RAM, may identify one or more uplink resources on which the RAM is to be transmitted, and/or the like.

As shown by reference number 415, the UE 120 may transmit a RAM preamble. As shown by reference number 420, the UE 120 may transmit a RAM payload. As shown, the UE 120 may transmit the RAM preamble and the RAM payload as part of a first step of the two-step RACH procedure. The RAM is sometimes referred to as message A, msgA, an uplink message, a request message, a first (or initial) message in a two-step RACH procedure, and/or the like. The RAM preamble is sometimes referred to as a message A preamble, a msgA preamble, a preamble, and/or the like. The RAM payload is sometimes referred to as a message A payload, a msgA payload, a payload, and/or the like.

In some aspects, the RAM may include some or all of the contents of message 1 (msg1) and message 3 (msg3) of a four-step RACH procedure. For example, the RAM preamble may include some or all contents of message 1 (e.g., a RACH preamble), and the RAM payload may include some or all contents of message 3. For example, in some aspects, the RAM payload may include an identifier associated with the UE 120, uplink control information, a medium access control (MAC) layer control element (e.g., a power headroom report, a buffer status report, a beam failure report, a channel state report, and/or the like), user plane data, control plane data, and/or the like. Furthermore, in some aspects, the msgA preamble and the msgA payload may be time division multiplexed (TDMed) with one another, whereby the msgA preamble and the msgA payload may be transmitted in separate symbols based at least in part on a time division multiplexing configuration.

As shown by reference number 425, the base station 110 may receive the RAM preamble transmitted by the UE 120. If the base station 110 successfully receives and decodes the RAM preamble, the base station 110 may then receive and decode the RAM payload. As shown by reference number 430, the base station 110 may transmit a random access response (RAR) message. As shown, the base station 110 may transmit the RAR message as part of a second step of the two-step RACH procedure. The RAR message is sometimes referred to as message B, msgB, a response message, a second message in a two-step RACH procedure, and/or the like.

The RAR message may include some or all of the contents of message 2 (msg2) and message 4 (msg4) of a four-step RACH procedure. For example, the RAR message may include the detected RACH preamble identifier, the detected UE identifier, a timing advance value, contention resolution information, and/or the like. In some aspects, the RAR message may include a first portion transmitted via a physical downlink control channel (PDCCH) (e.g., to include some or all of the contents of msg2 of the four-step RACH procedure) and a second portion transmitted via a physical downlink shared channel (PDSCH) (e.g., to include some or all of the contents of msg4 of the four-step RACH procedure). In some aspects, based on whether the UE 120 successfully receives and decodes the RAR message, the UE 120 may transmit hybrid automatic repeat request (HARD) feedback to the base station 110 via a physical uplink control channel (PUCCH) (e.g., an acknowledgement (ACK) to indicate that the RAR message was successfully received and decoded or a negative acknowledgement (NACK) to indicate that the RAR message was not successfully received and decoded).

The existing NR specification has been developed to support both periodical and on-demand broadcasting of SI. In existing specifications, on-demand SIB may be requested by a UE 120 using msg 1 or msg 3 of the four-step RACH. With the introduction of new use cases and UE capabilities, not all SIBs may necessarily be useful to the UE 120. For example, a BS 110 may provide network service to a premium UE 120 (which may be termed a legacy UE or a high-tier UE), a reduced capability UE (which may be termed a low-tier UE), and/or the like. Information contained in SIBs for premium UEs may not be relevant to reduced capability UEs.

"Premium UE" may refer to a UE that is associated with a receive bandwidth capability in receiving downlink signals/channels that is above a particular threshold (for example, a bandwidth of greater than or equal to 100 megahertz (MHz)). In contrast, "reduced capability UE" (which may be referred to as an "NR-Light UE," and/or a "reduced-cap UE") may refer to a UE with a bandwidth capability in receiving the downlink signals/channels that is below a particular threshold (for example, a bandwidth of less than 10 MHz, less than 5 MHz, and/or the like). Reduced capability UEs may include wearable devices, Internet of Things (IoT) devices, sensors, cameras, and/or the like that are associated with a limited bandwidth, power capacity, transmission range, and/or the like.

Various aspects of the techniques and apparatuses described herein may include providing dedicated SIBs that include information relevant to the UE categories (e.g., premium, reduced capability, and/or the like) to which the dedicated SIBs are directed. In some aspects, SI that may previously have been available through always-on (periodical) broadcasting may be made available upon request as on-demand SI. In some aspects, a BS may utilize msg 2 of four-step RACH, msg 4 of four-step RACH, MSI, msg B of two-step RACH, and/or the like for indicating dedicated on-demand SIBs. These techniques may facilitate reducing signaling overhead of always-on broadcasting. In some aspects, UEs may be able to use msg 1 of four-step RACH, an ACK for msg 4 of four-step RACH, msg A of two-step RACH, an ACK of msg B of two-step RACH, a medium access control (MAC) control element (CE), uplink control information (UCI), and/or the like for requesting on-demand SIBs. Aspects such as these may facilitate reducing the monitoring occasions of PDCCH, improve co-existence of UEs with different capabilities, and/or the like.

As indicated above, FIG. 4 is provided as an example. Other examples may differ from what is described with respect to FIG. 4.

Figure 5:
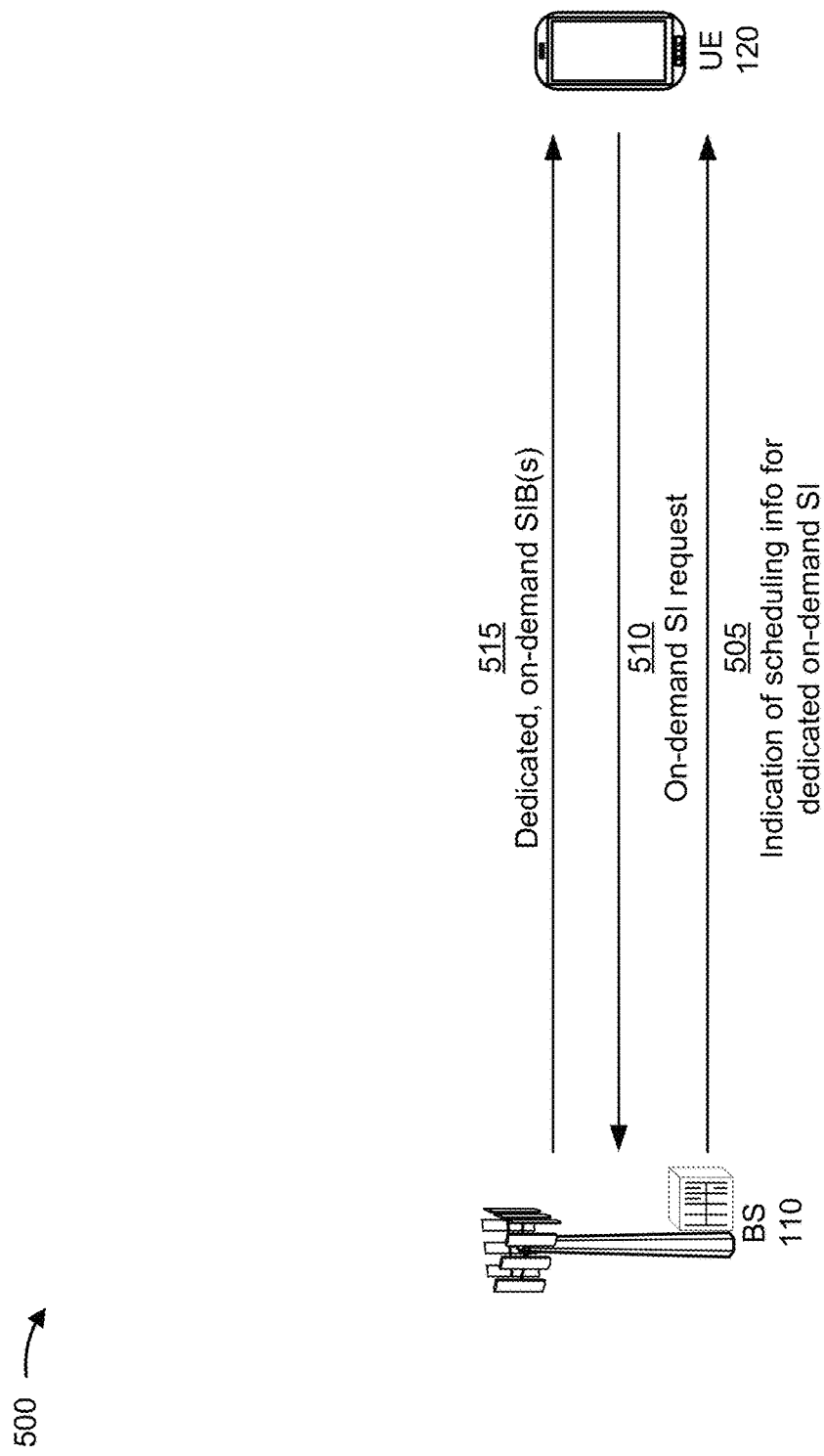
FIG. 5 is a diagram illustrating an example of an enhanced on-demand system information procedure, in accordance with various aspects of the present disclosure.

FIG. 5 is a diagram illustrating an example 500 of an enhanced on-demand system information procedure, in accordance with various aspects of the present disclosure. As shown in FIG. 5, a BS 110 and a UE 120 may communicate with one another.

As shown by reference number 505, the BS 110 may transmit, and the UE 120 may receive, an indication of scheduling information for dedicated on-demand SI. The dedicated on-demand SI may include information corresponding to a specified UE category (e.g., premium UE, reduced capability, and/or the like). In some aspects, the information corresponding to a specified UE category may include an indication of a repetition pattern for repeating transmissions to the UE, an SIB transmission window, an index to a control resource set lookup table, and/or the like. In some aspects, the on-demand SI request may include an indication of a UE use case, a UE capability, and/or the like.

In some aspects, the indication may be carried in an MSI communication, a radio resource control (RRC) message, a response message of a two-step RACH procedure, a RAR message of a four-step RACH procedure, a contention resolution message of a four-step RACH procedure, and/or the like. In some aspects, the MSI communication may include a master information block (MIB), a dedicated MIB, where the dedicated MIB comprises information corresponding to the specified UE category, a system information block 1 (SIB1), a dedicated SIB1, where the dedicated SIB1 comprises information corresponding to the specified UE category, and/or the like.

In some aspects, a dedicated MIB may include an existing MIB (an MIB defined in an existing specification, which may be referred to herein as a "legacy MIB") modified by one or more of a number of techniques, a new MIB defined in a specification, and/or the like. For example, in some aspects, a dedicated MIB may include an existing MIB modified by using one or more previously unused bits to carry the information corresponding to the specified UE category. For example, existing MIBs include reserve bits. In some aspects, the reserve bits may be used to carry the information corresponding to the specified UE category. In some aspects, a dedicated MIB may include an existing MIB modified by adding one or more new data fields to carry the information corresponding to the specified UE category, adding one or more new information elements (IEs) to carry the information corresponding to the specified UE category, and/or the like.

In some aspects, a dedicated SIB1 may include an existing SIB1 (which may be referred to herein as a "legacy SIB1") modified by using one or more techniques described herein, a new SIB1 defined in a specification, and/or the like. In some aspects, a dedicated SIB1 may include a legacy SIB1 modified by using previously unused bits to carry information corresponding to a specified UE category, adding one or more new data fields to carry information corresponding to the specified UE category, adding one or more new IEs to carry information corresponding to a specified UE category, and/or the like.

In some aspects, the indication of scheduling information for dedicated on-demand SI may be carried in an augmented SIB1 IE configured to carry SI scheduling information. In some aspects, the indication may be carried in a dedicated IE mapped to at least one of a legacy SIB1, a dedicated SIB1, or a combination thereof. The mapping of the dedicated IE to the legacy SIB1, the dedicated SIB1, or the combination thereof may be established based at least in part on a priority associated with the dedicated on-demand SI.

As shown by reference number 510, the UE 120 may transmit, and the BS 110 may receive, an on-demand SI request based at least in part on the scheduling information. In some aspects, the on-demand SI request may be carried in a request message of a two-step RACH procedure. The on-demand SI request may be carried in a preamble of the request message, a payload of the request message, or a combination thereof. In some aspects, the on-demand SI request may be indicated using one or more dedicated parameters defined, in a specification, for the two-step RACH procedure.

The parameters may include, for example, a configuration index parameter (named as msgA-prach-ConfigurationIndex), a frequency division multiplex (FDM) parameter (named as msgA-FDM), a starting frequency parameter (named as msgA-FrequencyStart), a response window for a response message (named as msgB_ra-ResponseWindow), a power ramping step parameter (named as msgA_prach-powerRampingStep), a physical uplink shared channel (PUSCH) power ramping step parameter (named as msgA-_pusch-powerRampingStep), a physical RACH received target power parameter (named as msgA_prach-ReceivedTargetPower), a PUSCH received target power parameter (named as msgA_PUSCH-ReceivedTargetPower), and/or the like.

In some aspects, the on-demand SI request may be transmitted using a set of resources configured based at least in part on dedicated time resources for a RACH occasion (RO), dedicated frequency resources for the RO, dedicated code resources for the RO, dedicated time resources for a PUSCH occasion (PO), dedicated frequency resources for the PO, dedicated code resources for the PO, and/or the like. In some aspects, the on-demand SI request may be transmitted using a set of resources configured based at least in part on one or more dedicated SSB to RO association patterns.

In some aspects, the on-demand SI request may be transmitted as part of UCI. Transmitting the on-demand SI request may include piggybacking the UCI on a PUSCH message of a four-step RACH procedure. In some aspects, "piggybacking" may refer to puncturing the PUSCH communication with the UCI by replacing one or more bits of the PUSCH communication with one or more bits of the UCI. In some aspects, "piggybacking" may refer to rate-matching the PUSCH around the UCI. In this way, UCI may be transmitted on the PUSCH. In some aspects, the UCI may be piggybacked on a PUSCH portion of a request message of a two-step RACH procedure.

In some aspects, transmitting the on-demand SI request may include transmitting the UCI using a physical uplink control channel (PUCCH). The on-demand SI request may be multiplexed on the PUCCH with a hybrid automatic repeat request acknowledgement (HARQ-ACK) that is transmitted based at least in part on the contention resolution message of a four-step RACH procedure. In some aspects, the on-demand SI request may be multiplexed on the PUCCH with a HARQ-ACK that is transmitted based at least in part on a response message of a two-step RACH procedure. In some aspects, the on-demand SI request may be multiplexed on the PUCCH with a scheduling request (SR), a channel state information (CSI) report, and/or the like.

As shown by reference number 515, the BS 110 may transmit, and the UE 120 may receive, based at least in part on the on-demand SI request, one or more on-demand SIBs of a set of dedicated on-demand SIBs.

As indicated above, FIG. 5 is provided as an example. Other examples may differ from what is described with respect to FIG. 5.

Figure 6:
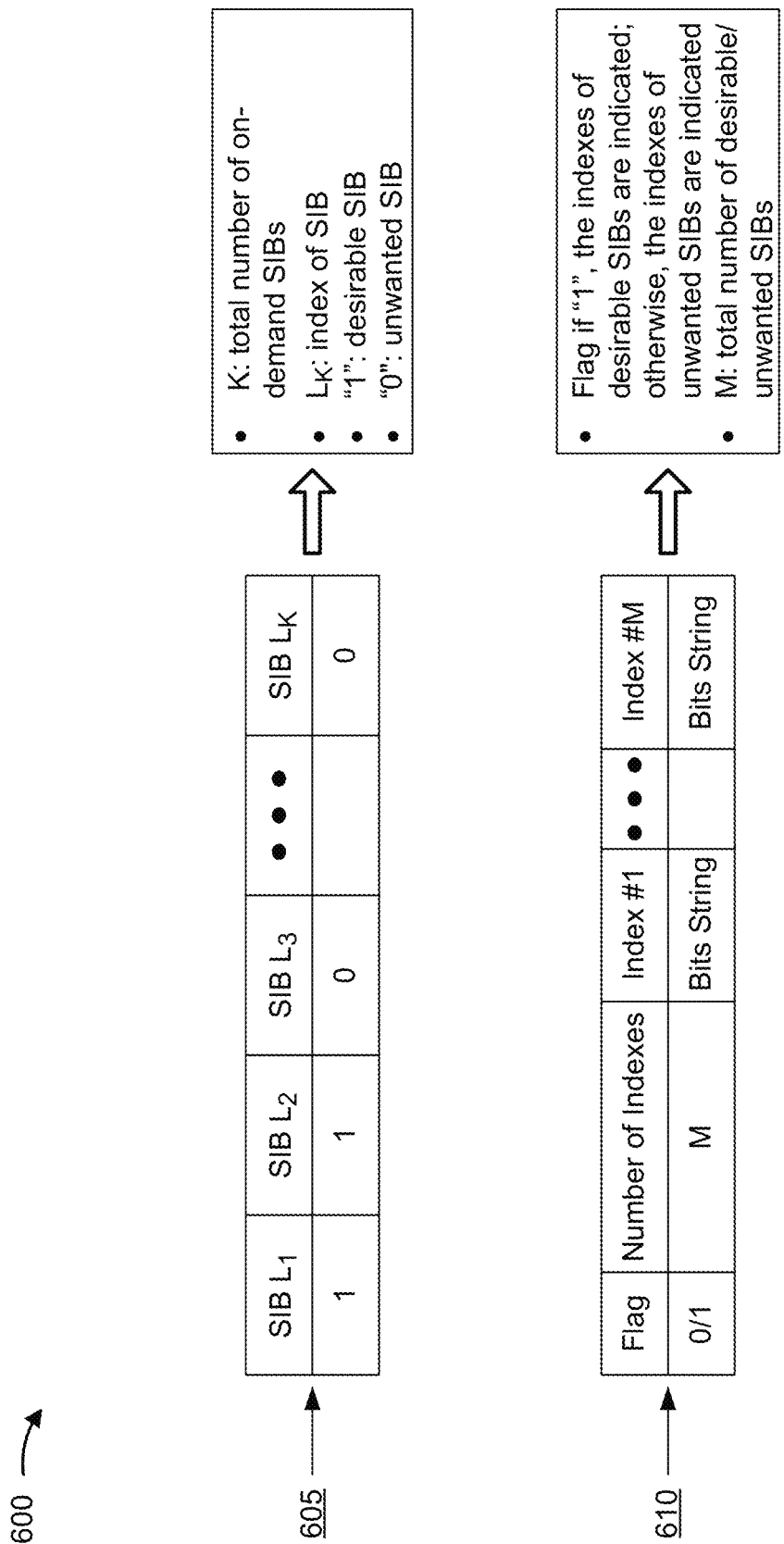
FIG. 6 is a diagram illustrating examples of enhanced on-demand system information requests, in accordance with various aspects of the present disclosure.

FIG. 6 is a diagram illustrating examples 600 of enhanced on-demand system information requests, in accordance with various aspects of the present disclosure.

In some aspects, an on-demand SI request may be transmitted by a UE 120 to a BS 110 using a dedicated medium access control (MAC) control element (CE) defined by a specification. As shown by reference number 605, the on-demand SI request may include a bitmap that includes a bit corresponding to each dedicated on-demand SIB of a set of dedicated on-demand SIBs. As shown, each bit indicates whether the corresponding on-demand SIB is to be included in a response to the on-demand SI request (labeled in FIG. 6 as a "desirable SIB") or is not to be included in the response (labeled in FIG. 6 as an "unwanted SIB").

In some aspects, the bitmap 605 may be defined as a new MAC-CE for transmission via a payload of a request message of a two-step RACH procedure. In some aspects, transmitting the on-demand SI request may include multiplexing the new MAC-CE with a common control channel (CCCH) message, an additional MAC-CE, and/or the like.

As shown by reference number 610, the on-demand SI request may indicate a set of indices corresponding to either a subset of a set of dedicated on-demand SIBs that is to be included in a response to the on-demand SI request, or a subset of the set of dedicated on-demand SIBs that is not to be included in the response. Each index of the set of indices may be represented using a bit string. A flag bit may indicate whether the included bit strings refer to dedicated on-demand SIBs that are to be included or dedicated on-demand SIBs that are not to be included. The on-demand SI request may include a field that includes one or more bits that indicate the total number of indexes included in the on-demand SI request.

As indicated above, FIG. 6 is provided as an example. Other examples may differ from what is described with respect to FIG. 6.

Figure 7:
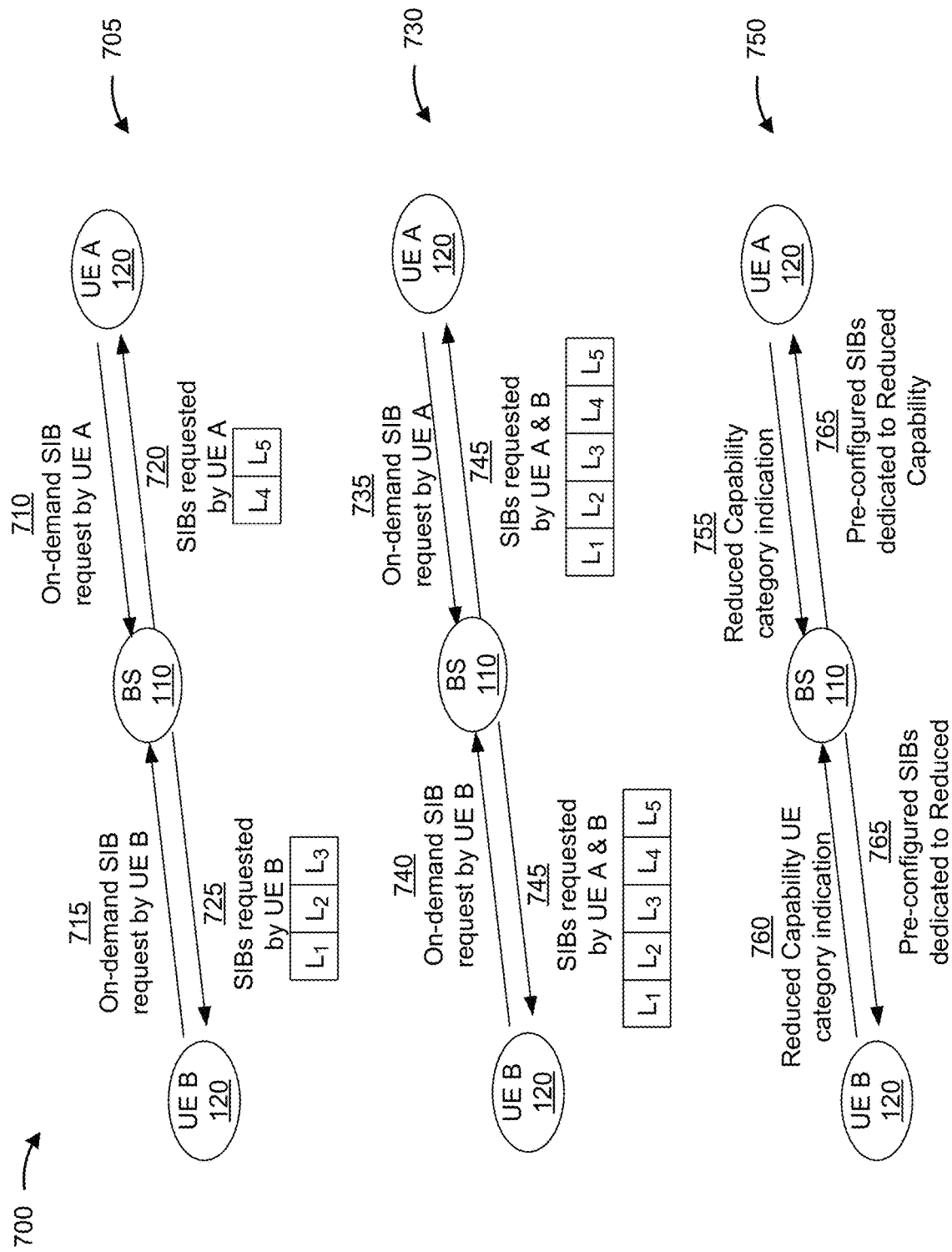
FIG. 7 is a diagram illustrating examples of enhanced on-demand system information procedures, in accordance with various aspects of the present disclosure.

FIG. 7 is a diagram illustrating examples 700 of enhanced on-demand system information procedures, in accordance with various aspects of the present disclosure. As shown in FIG. 7, a BS 110 may transmit requested on-demand SIBs using unicast transmissions and/or groupcast transmissions.

For example, as shown by reference number 705, a BS 110 may transmit requested SIBs using a unicast transmission for each requesting UE 120. As shown by reference number 710, a first UE 120 (shown as UE A) may transmit, and the BS 110 may receive, an on-demand SI request that identifies one or more on-demand SIBs (represented using SIB indices $L_4$ and $L_5$). As shown by reference number 715, a second UE 120 (shown as UE B) may transmit, and the BS 110 may receive, an on-demand SI request that identifies one or more on-demand SIBs (represented using SIB indices $L_1$, $L_2$, and $L_3$). As shown by reference number 720, the BS 110 may transmit, and the UE A 120 may receive, a unicast transmission including the dedicated on-demand SIBs that were requested by the UE A 120. Similarly, as shown by reference number 725, the BS 110 may transmit, and the UE B 120 may receive, a unicast transmission including the dedicated on-demand SIBs that were requested by the UE B 120.

In some aspects, as shown by reference numbers 730 and 750, a BS 110 may utilize groupcasting to transmit requested dedicated on-demand SIBs to multiple requesting UEs 120. As shown by reference number 735, a UE A 120 may transmit, and the BS 110 may receive, an on-demand SI request that identifies one or more on-demand SIBs (represented using SIB indices L1, $L_2$, $L_3$, $L_4$, and $L_5$). As shown by reference number 740, a UE B 120 may transmit, and the BS 110 may receive, an on-demand SI request that identifies the same SIBs. As shown by reference number 745, the BS 110 may transmit, and the UE A 120 and UE B 120 may receive, a groupcast transmission that includes the union of the set of SIBs requested by each UE 120.

As shown by reference number 750, in some aspects, on-demand SI requests may identify a UE category and/or capability associated with the UE 120, and the BS 110 may transmit a groupcast transmission based at least in part on the on-demand SI requests that includes pre-configured SIBs dedicated to the UE category and/or capability.

As shown by reference number 755, a UE A 120 may transmit, and the BS 110 may receive, an on-demand SI request that identifies a UE category (shown as "reduced capability"). As shown by reference number 760, a UE B 120 may transmit, and the BS 110 may receive, an on-demand SI request that identifies the same UE category. As shown by reference number 765, the BS 110 may transmit, and the UE A 120 and UE B 120 may receive, a groupcast transmission that includes a set of pre-configured SIBs dedicated to the identified UE category ("reduced capability").

As indicated above, FIG. 7 is provided as an example. Other examples may differ from what is described with respect to FIG. 7.

Figure 8:
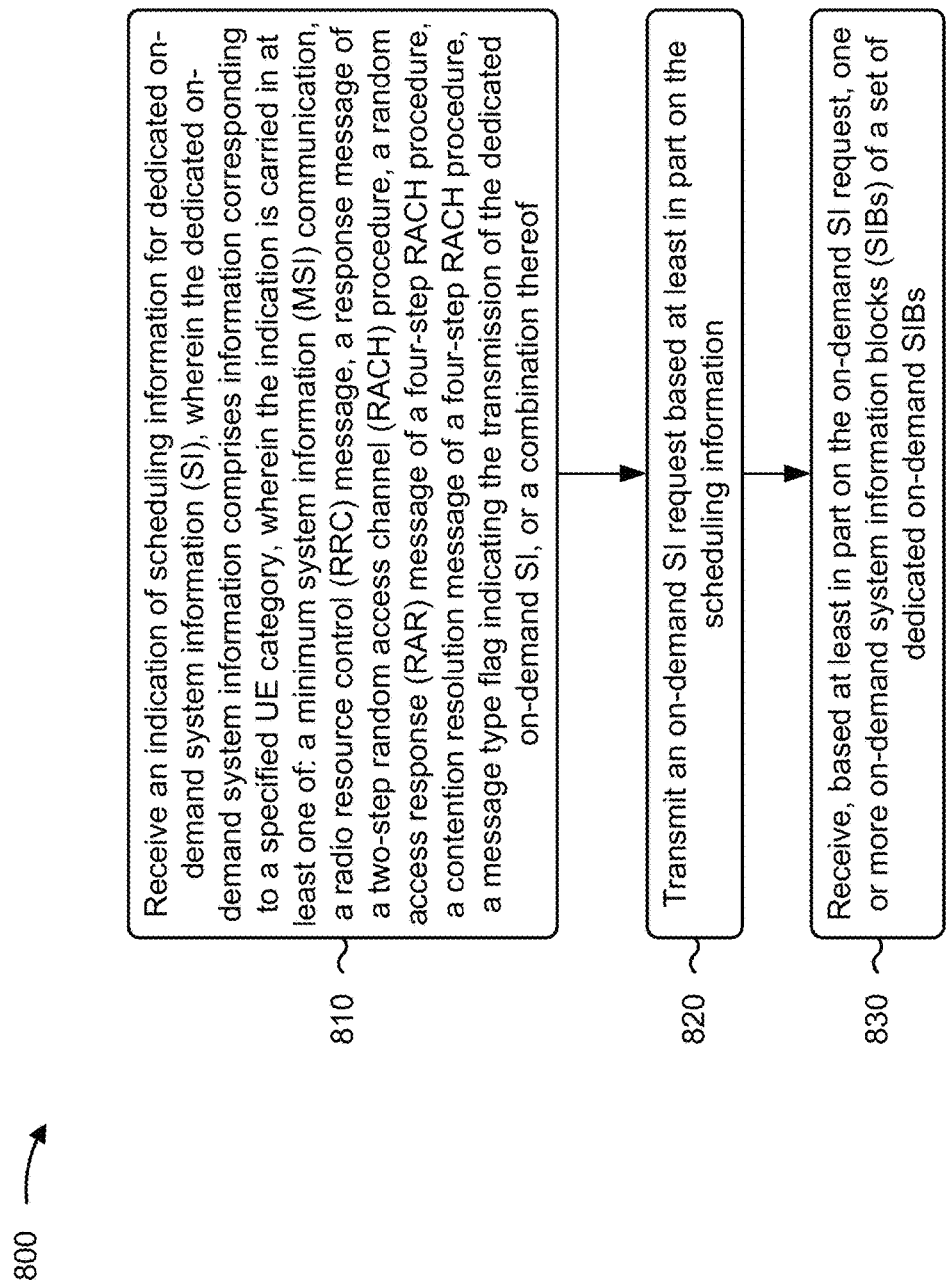
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with enhanced on-demand system information.

As shown in FIG. 8, in some aspects, process 800 may include receiving, from a BS, an indication of scheduling information for dedicated on-demand SI, wherein the dedicated on-demand SI comprises information corresponding to a specified UE category, wherein the indication is carried in at least one of: an MSI communication, an RRC message, a response message of a two-step RACH procedure, a RAR message of a four-step RACH procedure, a contention resolution message of a four-step RACH procedure, a message type flag indicating a transmission of the dedicated on-demand SI, or a combination thereof (block 810). For example, the UE (e.g., using receive processor 258, controller/processor 280, memory 282, and/or the like) may receive, from a BS, an indication of scheduling information for dedicated on-demand SI, as described above. In some aspects, the dedicated on-demand SI comprises information corresponding to a specified UE category. In some aspects, the indication is carried in at least one of an MSI communication, an RRC message, a response message of a two-step RACH procedure, a RAR message of a four-step RACH procedure, a contention resolution message of a four-step RACH procedure, or a combination thereof.

As further shown in FIG. 8, in some aspects, process 800 may include transmitting, to the BS, an on-demand SI request based at least in part on the scheduling information (block 820). For example, the UE (e.g., using transmit processor 264, controller/processor 280, memory 282, and/or the like) may transmit, to the BS, an on-demand SI request based at least in part on the scheduling information, as described above.

As further shown in FIG. 8, in some aspects, process 800 may include receiving, from the BS and based at least in part on the on-demand SI request, one or more on-demand SIBs of a set of dedicated on-demand SIBs (block 830). For example, the UE (e.g., using receive processor 258, controller/processor 280, memory 282, and/or the like) may receive, from the BS and based at least in part on the on-demand SI request, one or more on-demand SIBs of a set of dedicated on-demand SIBs, as described above.

Process 800 may include additional aspects, such as any single aspect or any combination of aspects described below and/or in connection with one or more other processes described elsewhere herein.

In a first aspect, the MSI communication comprises: a legacy master information block (MIB), a dedicated MIB, wherein the dedicated MIB comprises information corresponding to the specified UE category, a legacy system information block 1 (SIB1), a dedicated SIB1, wherein the dedicated SIB1 comprises information corresponding to the specified UE category, or a combination thereof.

In a second aspect, alone or in combination with the first aspect, the dedicated MIB comprises wherein the dedicated MIB comprises a legacy MIB modified by: using one or more previously unused bits to carry the information corresponding to the specified UE category, adding one or more new data fields, wherein the one or more new data fields carry the information corresponding to the specified UE category, adding one or more new information elements (IEs), wherein the one or more new IEs carry the information corresponding to the specified UE category, configuring a different value range for one or more existing data fields of the legacy MIB, configuring an MIB message type flag to indicate a new dedicated MIB transmission, or a combination thereof.

In a third aspect, alone or in combination with one or more of the first and second aspects, the specified UE category comprises a reduced capability UE type.

In a fourth aspect, alone or in combination with one or more of the first through third aspects, the dedicated MIB comprises a new MIB defined in a specification and an MIB message type flag that is multiplexed with contents of the new MIB.

In a fifth aspect, alone or in combination with one or more of the first through fourth aspects, the dedicated SIB1 comprises a legacy SIB1 modified by: using one or more previously unused bits to carry information corresponding to a specified UE category, adding one or more new data fields, wherein the one or more new data fields carry information corresponding to the specified UE category, adding one or more new information elements (IEs), wherein the one or more new IEs carry information corresponding to a specified UE category, configuring a different value range for one or more existing data fields of the legacy SIB1, configuring a SIB1 message type flag to indicate a new dedicated SIB1 transmission, or a combination thereof.

In a sixth aspect, alone or in combination with one or more of the first through fifth aspects, the specified UE category comprises a group of new UE capabilities specified for a reduced capability device type.

In a seventh aspect, alone or in combination with one or more of the first through sixth aspects, the dedicated SIB1 comprises a new SIB1 defined in a specification and a SIB1 message type flag that is multiplexed with contents of the new SIB1.

In an eighth aspect, alone or in combination with one or more of the first through seventh aspects, the information corresponding to the specified UE category comprises at least one of: an indication of at least one of a repetition pattern or a frequency hopping pattern for repeating transmissions to the UE, an SIB transmission window configuration including at least one of a periodicity or a time offset relative to a system frame number (SFN), an index to a control resource set lookup table, a SIB message type flag indicating transmission of a new SIB for a specified UE category, or a combination thereof.

In a ninth aspect, alone or in combination with one or more of the first through eighth aspects, the indication of scheduling information for dedicated on-demand SI is carried in at least one of: an augmented SIB1 information element (IE) configured to carry SI scheduling information, a dedicated IE, wherein the dedicated IE is mapped to at least one of a SIB1, a dedicated SIB1, or a combination thereof, or a combination thereof.

In a tenth aspect, alone or in combination with one or more of the first through ninth aspects, a mapping of the dedicated IE to the SIB1, the dedicated SIB1, or the combination thereof is established based at least in part on a priority associated with the dedicated on-demand SI.

In an eleventh aspect, alone or in combination with one or more of the first through tenth aspects, the on-demand SI request is carried in a request message of a two-step RACH procedure.

In a twelfth aspect, alone or in combination with one or more of the first through eleventh aspects, the on-demand SI request is carried in at least one of: a preamble of the request message of the two-step RACH procedure, a payload of the request message of the two-step RACH procedure, or a combination thereof.

In a thirteenth aspect, alone or in combination with one or more of the first through twelfth aspects, the on-demand SI request is indicated using one or more dedicated parameters defined, in a specification, for the two-step RACH procedure.

In a fourteenth aspect, alone or in combination with one or more of the first through thirteenth aspects, the on-demand SI request comprises an indication of at least one of a UE use case, a UE capability, or a combination thereof.

In a fifteenth aspect, alone or in combination with one or more of the first through fourteenth aspects, the on-demand SI request is transmitted using a set of resources, the set of resources is configured based at least in part on: dedicated time resources for a RACH occasion (RO), dedicated frequency resources for the RO, dedicated code resources for the RO, dedicated time resources for a physical uplink shared channel (PUSCH) occasion (PO), dedicated frequency resources for the PO, dedicated code resources for the PO, or a combination thereof.

In a sixteenth aspect, alone or in combination with one or more of the first through fifteenth aspects, the on-demand SI request is transmitted using a set of resources, the set of resources is configured based at least in part on one or more dedicated synchronization signal block (SSB) to RACH occasion (RO) association patterns.

In a seventeenth aspect, alone or in combination with one or more of the first through sixteenth aspects, the on-demand SI request is transmitted using a dedicated medium access control (MAC) control element (CE) defined by a specification.

In an eighteenth aspect, alone or in combination with one or more of the first through seventeenth aspects, the on-demand SI request comprises a bitmap that includes a bit corresponding to each dedicated on-demand SIB of the set of dedicated on-demand SIBs, the bit corresponding to each dedicated on-demand SIB indicates whether the corresponding on-demand SIB is to be included in a response to the on-demand SI request or not to be included in the response.

In a nineteenth aspect, alone or in combination with one or more of the first through eighteenth aspects, the bitmap is defined as a new MAC-CE for transmission via the payload of the request message of the two-step RACH procedure.

In a twentieth aspect, alone or in combination with one or more of the first through nineteenth aspects, transmitting the on-demand SI request comprises multiplexing the new MAC-CE with at least one of a common control channel (CCCH) message, an additional MAC-CE, or a combination thereof.

In a twenty-first aspect, alone or in combination with one or more of the first through twentieth aspects, the on-demand SI request indicates a set of indices corresponding to either: a subset of the set of dedicated on-demand SIBs that is to be included in a response to the on-demand SI request, or a subset of the set of dedicated on-demand SIBs that is not to be included in a response to the on-demand SI request.

In a twenty-second aspect, alone or in combination with one or more of the first through twenty-first aspects, the on-demand SI request is transmitted using uplink control information (UCI).

In a twenty-third aspect, alone or in combination with one or more of the first through twenty-second aspects, transmitting the on-demand SI request comprises piggybacking the UCI on a physical uplink shared channel (PUSCH) message of the four-step RACH procedure.

In a twenty-fourth aspect, alone or in combination with one or more of the first through twenty-third aspects, transmitting the on-demand SI request comprises piggybacking the UCI on a PUSCH portion of a request message of the two-step RACH procedure.

In a twenty-fifth aspect, alone or in combination with one or more of the first through twenty-fourth aspects, transmitting the on-demand SI request comprises transmitting the UCI using a physical uplink control channel (PUCCH), wherein the on-demand SI request is multiplexed with a hybrid automatic repeat request acknowledgement (HARQ-ACK) that is transmitted based at least in part on the contention resolution message of the four-step RACH procedure.

In a twenty-sixth aspect, alone or in combination with one or more of the first through twenty-fifth aspects, transmitting the on-demand SI request comprises transmitting the UCI using a PUCCH, wherein the on-demand SI request is multiplexed with a HARQ-ACK that is transmitted based at least in part on the response message of the two-step RACH procedure.

In a twenty-seventh aspect, alone or in combination with one or more of the first through twenty-sixth aspects, transmitting the on-demand SI request comprises transmitting the UCI using a PUCCH, wherein the on-demand SI request is multiplexed with at least one of a scheduling request, a channel state information report, or a combination thereof.

In a twenty-eighth aspect, alone or in combination with one or more of the first through twenty-seventh aspects, the on-demand SI request identifies the one or more on-demand SIBs, and receiving the one or more on-demand dedicated SIBs comprises receiving a unicast transmission based at least in part on the on-demand SI request.

In a twenty-ninth aspect, alone or in combination with one or more of the first through twenty-eighth aspects, the on-demand SI request identifies a subset of the set of dedicated on-demand SIBs, and receiving the one or more on-demand dedicated SIBs comprises receiving a groupcast transmission based at least in part on the on-demand SI request and an additional on-demand SI request from an additional UE.

In a thirtieth aspect, alone or in combination with one or more of the first through twenty-ninth aspects, the on-demand SI request identifies a UE category associated with the UE, and receiving the one or more on-demand dedicated SIBs comprises receiving a groupcast transmission based at least in part on the on-demand SI request and an additional on-demand SI request from an additional UE, the additional on-demand SI request indicates that the UE category is associated with the additional UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
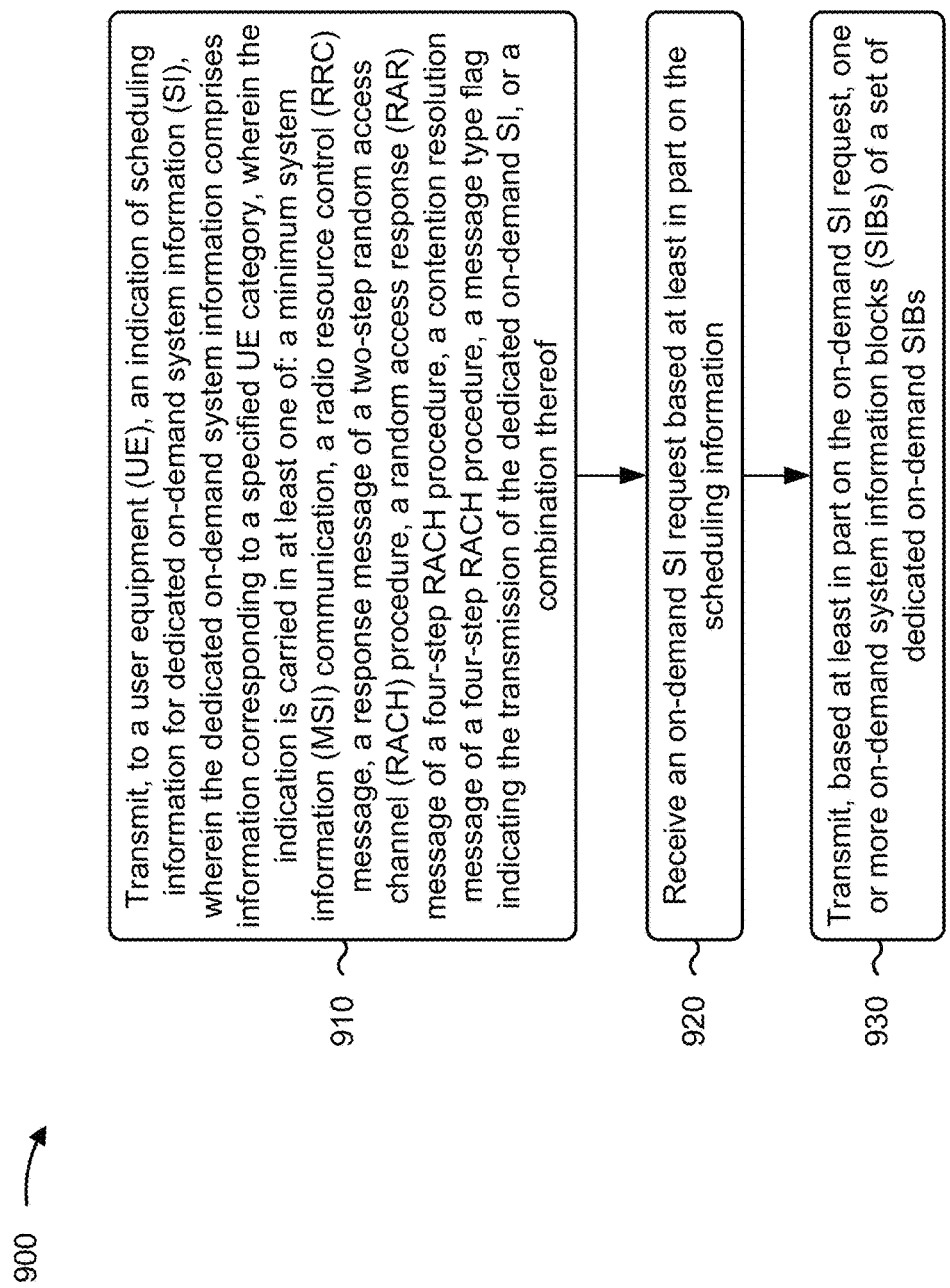
FIG. 9 is a diagram illustrating an example process performed, for example, by a base station, in accordance with various aspects of the present disclosure.

FIG. 9 is a diagram illustrating an example process 900 performed, for example, by a BS, in accordance with various aspects of the present disclosure. Example process 900 is an example where the BS (e.g., BS 110 and/or the like) performs operations associated with enhanced on-demand system information.

As shown in FIG. 9, in some aspects, process 900 may include transmitting, to a UE, an indication of scheduling information for dedicated on-demand SI, wherein the dedicated on-demand SI comprises information corresponding to a specified UE category, wherein the indication is carried in at least one of: an MSI communication, an RRC message, a response message of a two-step RACH procedure, an RAR message of a four-step RACH procedure, a contention resolution message of a four-step RACH procedure, a message type flag indicating a transmission of the dedicated on-demand SI, or a combination thereof (block 910). For example, the BS (e.g., using transmit processor 220, controller/processor 240, memory 242, and/or the like) may transmit, to a UE, an indication of scheduling information for dedicated on-demand SI, as described above. In some aspects, the dedicated on-demand SI comprises information corresponding to a specified UE category. In some aspects, the indication is carried in at least one of an MSI communication, an RRC message, a response message of a two-step RACH procedure, an RAR message of a four-step RACH procedure, a contention resolution message of a four-step RACH procedure, or a combination thereof.

As further shown in FIG. 9, in some aspects, process 900 may include receiving, from the UE, an on-demand SI request based at least in part on the scheduling information (block 920). For example, the BS (e.g., using receive processor 238, controller/processor 240, memory 242, and/or the like) may receive, from the UE, an on-demand SI request based at least in part on the scheduling information, as described above.

As further shown in FIG. 9, in some aspects, process 900 may include transmitting, to the UE and based at least in part on the on-demand SI request, one or more on-demand SIBs of a set of dedicated on-demand SIBs (block 930). For example, the BS (e.g., using transmit processor 220, controller/processor 240, memory 242, and/or the like) may transmit, to the UE and based at least in part on the on-demand SI request, one or more on-demand SIBs of a set of dedicated on-demand SIBs, as described above.

Process 900 may include additional aspects, such as any single aspect or any combination of aspects described below and/or in connection with one or more other processes described elsewhere herein.

In a first aspect, the MSI communication comprises: a legacy master information block (MIB), a dedicated MIB, wherein the dedicated MIB comprises information corresponding to the specified UE category, a legacy system information block 1 (SIB1), a dedicated SIB1, wherein the dedicated SIB1 comprises information corresponding to the specified UE category, or a combination thereof.

In a second aspect, alone or in combination with the first aspect, the dedicated MIB comprises a legacy MIB modified by: using one or more previously unused bits to carry the information corresponding to the specified UE category, adding one or more new data fields, wherein the one or more new data fields carry the information corresponding to the specified UE category, adding one or more new information elements (IEs), wherein the one or more new IEs carry the information corresponding to the specified UE category, configuring a different value range for one or more existing data fields of the legacy MIB, configuring an MIB message type flag to indicate a new dedicated MIB transmission, or a combination thereof.

In a third aspect, alone or in combination with one or more of the first and second aspects, the specified UE category comprises reduced capability device type.

In a fourth aspect, alone or in combination with one or more of the first through third aspects, the dedicated MIB comprises a new MIB defined in a specification and an MIB message type flag indicating the transmission of the new MIB.

In a fifth aspect, alone or in combination with one or more of the first through fourth aspects, the dedicated SIB1 comprises a legacy SIB1 modified by: using one or more previously unused bits to carry information corresponding to a specified UE category, adding one or more new data fields, wherein the one or more new data fields carry information corresponding to the specified UE category, adding one or more new information elements (IEs), wherein the one or more new IEs carry information corresponding to a specified UE category, configuring a different value range for one or more existing data fields of the legacy SIB1, configuring a SIB1 message type flag to indicate a new dedicated SIB1 transmission, or a combination thereof.

In a sixth aspect, alone or in combination with one or more of the first through fifth aspects, the specified UE category comprises an NR-light type.

In a seventh aspect, alone or in combination with one or more of the first through sixth aspects, the dedicated SIB1 comprises a new SIB1 defined in a specification and a SIB1 message type flag indicating the transmission of the new SIB1.

In an eighth aspect, alone or in combination with one or more of the first through seventh aspects, the information corresponding to the specified UE category comprises at least one of: an indication of at least one of a repetition pattern or a frequency hopping pattern for repeating transmissions to the UE, an SIB transmission window configuration including at least one of a periodicity or a time offset relative to a system frame number (SFN), an index to a control resource set lookup table, a SIB message type flag indicating transmission of a new SIB for a specified UE category, or a combination thereof.

In a ninth aspect, alone or in combination with one or more of the first through eighth aspects, the indication of scheduling information for dedicated on-demand SI is carried in at least one of: an augmented SIB1 IE configured to carry SI scheduling information, a dedicated IE, wherein the dedicated IE is mapped to at least one of a SIB1, a dedicated SIB1, or a combination thereof, or a combination thereof.

In a tenth aspect, alone or in combination with one or more of the first through ninth aspects, a mapping of the dedicated IE to the SIB1, the dedicated SIB1, or the combination thereof is established based at least in part on a priority associated with the dedicated on-demand SI.

In an eleventh aspect, alone or in combination with one or more of the first through tenth aspects, the on-demand SI request is carried in a request message of a two-step RACH procedure.

In a twelfth aspect, alone or in combination with one or more of the first through eleventh aspects, the on-demand SI request is carried in at least one of: a preamble of the request message of the two-step RACH procedure, a payload of the request message of the two-step RACH procedure, or a combination thereof.

In a thirteenth aspect, alone or in combination with one or more of the first through twelfth aspects, the on-demand SI request is indicated using one or more dedicated parameters defined, in a specification, for the two-step RACH procedure.

In a fourteenth aspect, alone or in combination with one or more of the first through thirteenth aspects, the on-demand SI request comprises an indication of at least one of a UE use case, a UE capability, or a combination thereof.

In a fifteenth aspect, alone or in combination with one or more of the first through fourteenth aspects, the on-demand SI request is received via a set of resources, the set of resources is configured based at least in part on: dedicated time resources for an RO, dedicated frequency resources for the RO, dedicated code resources for the RO, dedicated time resources for a PO, dedicated frequency resources for the PO, dedicated code resources for the PO, or a combination thereof.

In a sixteenth aspect, alone or in combination with one or more of the first through fifteenth aspects, the on-demand SI request is received via a set of resources, the set of resources is configured based at least in part on one or more dedicated synchronization signal block (SSB) to RACH occasion (RO) association patterns.

In a seventeenth aspect, alone or in combination with one or more of the first through sixteenth aspects, the on-demand SI request is received via a dedicated MAC-CE defined by a specification.

In an eighteenth aspect, alone or in combination with one or more of the first through seventeenth aspects, the on-demand SI request comprises a bitmap that includes a bit corresponding to each dedicated on-demand SIB of the set of dedicated on-demand SIBs, the bit corresponding to each dedicated on-demand SIB indicates whether the corresponding on-demand SIB is to be included in a response to the on-demand SI request or not to be included in the response.

In a nineteenth aspect, alone or in combination with one or more of the first through eighteenth aspects, the bitmap is defined as a new MAC-CE for transmission via the payload of the request message of the two-step RACH procedure.

In a twentieth aspect, alone or in combination with one or more of the first through nineteenth aspects, the UE transmits the on-demand SI request by multiplexing the new MAC-CE with at least one of a CCCH message, an additional MAC-CE, or a combination thereof.

In a twenty-first aspect, alone or in combination with one or more of the first through twentieth aspects, the on-demand SI request indicates a set of indices corresponding to either: a subset of the set of dedicated on-demand SIBs that is to be included in a response to the on-demand SI request, or a subset of the set of dedicated on-demand SIBs that is not to be included in a response to the on-demand SI request.

In a twenty-second aspect, alone or in combination with one or more of the first through twenty-first aspects, the on-demand SI request is received via UCI.

In a twenty-third aspect, alone or in combination with one or more of the first through twenty-second aspects, the UE transmits the on-demand SI request by piggybacking the UCI on a PUSCH message of the four-step RACH procedure.

In a twenty-fourth aspect, alone or in combination with one or more of the first through twenty-third aspects, the UE transmits the on-demand SI request by piggybacking the UCI on a PUSCH portion of a request message of the two-step RACH procedure.

In a twenty-fifth aspect, alone or in combination with one or more of the first through twenty-fourth aspects, the UE transmits the on-demand SI request by transmitting the UCI using a PUCCH, the on-demand SI request is multiplexed with a HARQ-ACK that is transmitted based at least in part on the contention resolution message of the four-step RACH procedure.

In a twenty-sixth aspect, alone or in combination with one or more of the first through twenty-fifth aspects, the UE transmits the on-demand SI request by transmitting the UCI using a PUCCH, the on-demand SI request is multiplexed with a HARQ-ACK that is transmitted based at least in part on the response message of the two-step RACH procedure.

In a twenty-seventh aspect, alone or in combination with one or more of the first through twenty-sixth aspects, the UE transmits the on-demand SI request by transmitting the UCI using a PUCCH, the on-demand SI request is multiplexed with at least one of a scheduling request, a channel state information report, or a combination thereof.

In a twenty-eighth aspect, alone or in combination with one or more of the first through twenty seventh aspects, the on-demand SI request identifies the one or more on-demand SIBs, and transmitting the one or more on-demand dedicated SIBs comprises transmitting a unicast transmission based at least in part on the on-demand SI request.

In a twenty-ninth aspect, alone or in combination with one or more of the first through twenty-eighth aspects, the on-demand SI request identifies a subset of the set of dedicated on-demand SIBs, and transmitting the one or more on-demand dedicated SIBs comprises transmitting a groupcast transmission based at least in part on the on-demand SI request and an additional on-demand SI request from an additional UE.

In a thirtieth aspect, alone or in combination with one or more of the first through twenty-ninth aspects, the on-demand SI request identifies a UE category associated with the UE, and transmitting the one or more on-demand dedicated SIBs comprises transmitting a groupcast transmission based at least in part on the on-demand SI request and an additional on-demand SI request from an additional UE, the additional on-demand SI request indicates that the UE category is associated with the additional UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of aspects of the present disclosure:

Aspect 1: A method of wireless communication performed by a user equipment (UE), comprising: receiving, from a base station, an indication of scheduling information for dedicated on-demand system information (SI), wherein the dedicated on-demand system information comprises information corresponding to a specified UE category, wherein the indication is carried in at least one of: a minimum system information (MSI) communication, a radio resource control (RRC) message, a response message of a two-step random access channel (RACH) procedure, a random access response (RAR) message of a four-step RACH procedure, a contention resolution message of a four-step RACH procedure, a message type flag indicating the transmission of the dedicated on-demand SI, or a combination thereof; transmitting, to the base station, an on-demand SI request based at least in part on the scheduling information and the UE category; and receiving, from the base station and based at least in part on the on-demand SI request, one or more on-demand system information blocks (SIBs) of a set of dedicated on-demand SIBs.

Aspect 2: The method of aspect 1, wherein the MSI communication comprises: a legacy master information block (MIB), a dedicated MIB, wherein the dedicated MIB comprises information corresponding to the specified UE category, a legacy system information block 1 (SIB1), a dedicated SIB1, wherein the dedicated SIB1 comprises information corresponding to the specified UE category, or a combination thereof.

Aspect 3: The method of aspect 2, wherein the dedicated MIB comprises a legacy MIB modified by: using one or more previously unused bits to carry the information corresponding to the specified UE category, adding one or more new data fields, wherein the one or more new data fields carry the information corresponding to the specified UE category, adding one or more new information elements (IEs), wherein the one or more new IEs carry the information corresponding to the specified UE category, configuring a different value range for one or more existing data fields of the legacy MIB, configuring an MIB message type flag to indicate a new dedicated MIB transmission, or a combination thereof.

Aspect 4: The method of aspect 3, wherein the specified UE category comprises a reduced capability UE device type.

Aspect 5: The method of aspect 2, wherein the dedicated MIB comprises a new MIB defined in a specification and an MIB message type flag that is multiplexed with contents of the new MIB.

Aspect 6: The method of any of aspects 2-5, wherein the dedicated SIB1 comprises a legacy SIB1 modified by: using one or more previously unused bits to carry information corresponding to a specified UE category, adding one or more new data fields, wherein the one or more new data fields carry information corresponding to the specified UE category, adding one or more new information elements (IEs), wherein the one or more new IEs carry information corresponding to a specified UE category, configuring a different value range for one or more existing data fields of the legacy SIB1, configuring a SIB1 message type flag to indicate a new dedicated SIB1 transmission, or a combination thereof.

Aspect 7: The method of aspect 6, wherein the specified UE category comprises a group of new UE capabilities specified for a reduced capability device type.

Aspect 8: The method of any of aspects 2-5, wherein the dedicated SIB1 comprises a new SIB1 defined in a specification and a SIB1 message type flag that is multiplexed with contents of the new SIB1.

Aspect 9: The method of any of aspects 2-8, wherein the information corresponding to the specified UE category comprises at least one of: an indication of at least one of a repetition pattern or a frequency hopping pattern for repeating transmissions to the UE, an SIB transmission window configuration including at least one of a periodicity or a time offset relative to a system frame number (SFN), an index to a control resource set lookup table, a SIB message type flag indicating transmission of a new SIB for a specified UE category, or a combination thereof.

Aspect 10: The method of any of aspects 2-9, wherein the indication of scheduling information for dedicated on-demand SI is carried in at least one of: an augmented SIB1 information element (IE) configured to carry SI scheduling information, a dedicated IE, wherein the dedicated IE is mapped to at least one of a SIB1, a dedicated SIB1, or a combination thereof, or a combination thereof.

Aspect 11: The method of aspect 10, wherein a mapping of the dedicated IE to the SIB1, the dedicated SIB1, or the combination thereof is established based at least in part on a priority associated with the dedicated on-demand SI.

Aspect 12: The method of any of aspects 1-11, wherein the on-demand SI request is carried in a request message of a two-step RACH procedure.

Aspect 13: The method of aspect 12, wherein the on-demand SI request is carried in at least one of: a preamble of a request message of the two-step RACH procedure, a payload of a request message of the two-step RACH procedure, or a combination thereof.

Aspect 14: The method of either of aspects 12 or 13, wherein the on-demand SI request is indicated using one or more dedicated parameters defined, in a specification, for the two-step RACH procedure.

Aspect 15: The method of any of aspects 1-14, wherein the on-demand SI request comprises an indication of at least one of a UE use case, a UE capability, or a combination thereof.

Aspect 16: The method of any of aspects 1-15, wherein the on-demand SI request is transmitted using a set of resources, wherein the set of resources is configured based at least in part on: dedicated time resources for a RACH occasion (RO), dedicated frequency resources for the RO, dedicated code resources for the RO, dedicated time resources for a physical uplink shared channel (PUSCH) occasion (PO), dedicated frequency resources for the PO, dedicated code resources for the PO, or a combination thereof.

Aspect 17: The method of any of aspects 1-16, wherein the on-demand SI request is transmitted using a set of resources, wherein the set of resources is configured based at least in part on one or more dedicated synchronization signal block (SSB) to RACH occasion (RO) association patterns.

Aspect 18: The method of any of aspects 1-17, wherein the on-demand SI request is transmitted using a dedicated medium access control (MAC) control element (CE) defined by a specification.

Aspect 19: The method of any of aspects 1-18, wherein the on-demand SI request comprises a bitmap that includes a bit corresponding to each dedicated on-demand SIB of the set of dedicated on-demand SIBs, wherein the bit corresponding to each dedicated on-demand SIB indicates whether the corresponding on-demand SIB is to be included in a response to the on-demand SI request or not to be included in the response.

Aspect 20: The method of aspect 19, wherein the bitmap is defined as a new medium access control (MAC) control element (MAC-CE) for transmission via a payload of a request message of the two-step RACH procedure.

Aspect 21: The method of aspect 20, wherein transmitting the on-demand SI request comprises multiplexing the new MAC-CE with at least one of a common control channel (CCCH) message, an additional MAC-CE, or a combination thereof.

Aspect 22: The method of any of aspects 19-21, wherein the on-demand SI request indicates a set of indices corresponding to either: a subset of the set of dedicated on-demand SIBs that is to be included in a response to the on-demand SI request, or a subset of the set of dedicated on-demand SIBs that is not to be included in a response to the on-demand SI request.

Aspect 23: The method of any of aspects 1-22, wherein the on-demand SI request is transmitted using uplink control information (UCI).

Aspect 24: The method of aspect 23, wherein transmitting the on-demand SI request comprises piggybacking the UCI on a physical uplink shared channel (PUSCH) message of the four-step RACH procedure.

Aspect 25: The method of aspect 23, wherein transmitting the on-demand SI request comprises piggybacking the UCI on a physical uplink shared channel (PUSCH) portion of a request message of the two-step RACH procedure.

Aspect 26: The method of aspect 23, wherein transmitting the on-demand SI request comprises transmitting the UCI using a physical uplink control channel (PUCCH), wherein the on-demand SI request is multiplexed with a hybrid automatic repeat request acknowledgement (HARQ-ACK) that is transmitted based at least in part on the contention resolution message of the four-step RACH procedure.

Aspect 27: The method of aspect 23, wherein transmitting the on-demand SI request comprises transmitting the UCI using a physical uplink control channel (PUCCH), wherein the on-demand SI request is multiplexed with a hybrid automatic repeat request acknowledgement (HARQ-ACK) that is transmitted based at least in part on the response message of the two-step RACH procedure.

Aspect 28: The method of aspect 23, wherein transmitting the on-demand SI request comprises transmitting the UCI using a physical uplink control channel (PUCCH), wherein the on-demand SI request is multiplexed with at least one of a scheduling request, a channel state information report, or a combination thereof.

Aspect 29: The method of any of aspects 1-28, wherein the on-demand SI request identifies the one or more on-demand SIBs, and wherein receiving the one or more on-demand dedicated SIBs comprises receiving a unicast transmission based at least in part on the on-demand SI request.

Aspect 30: The method of any of aspects 1-28, wherein the on-demand SI request identifies a subset of the set of dedicated on-demand SIBs, and wherein receiving the one or more on-demand dedicated SIBs comprises receiving a groupcast transmission based at least in part on the on-demand SI request and an additional on-demand SI request from an additional UE.

Aspect 31: The method of any of aspects 1-28, wherein the on-demand SI request identifies a UE category associated with the UE, and wherein receiving the one or more on-demand dedicated SIBs comprises receiving a groupcast transmission based at least in part on the on-demand SI request and an additional on-demand SI request from an additional UE, wherein the additional on-demand SI request indicates that the UE category is associated with the additional UE.

Aspect 32: A method of wireless communication performed by a base station, comprising: transmitting, to a user equipment (UE), an indication of scheduling information for dedicated on-demand system information (SI), wherein the dedicated on-demand system information comprises information corresponding to a specified UE category, wherein the indication is carried in at least one of: a minimum system information (MSI) communication, a radio resource control (RRC) message, a response message of a two-step random access channel (RACH) procedure, a random access response (RAR) message of a four-step RACH procedure, a contention resolution message of a four-step RACH procedure, a message type flag indicating the transmission of the dedicated on-demand SI, or a combination thereof; receiving, from the UE, an on-demand SI request based at least in part on the scheduling information; and transmitting, to the UE and based at least in part on the on-demand SI request, one or more on-demand system information blocks (SIBs) of a set of dedicated on-demand SIBs.

Aspect 33: The method of aspect 32, wherein the MSI communication comprises: a legacy master information block (MIB), a dedicated MIB, wherein the dedicated MIB comprises information corresponding to the specified UE category, a legacy system information block 1 (SIB1), a dedicated SIB1, wherein the dedicated SIB1 comprises information corresponding to the specified UE category, or a combination thereof.

Aspect 34: The method of aspect 33, wherein the dedicated MIB comprises a legacy MIB modified by: using one or more previously unused bits to carry the information corresponding to the specified UE category, adding one or more new data fields, wherein the one or more new data fields carry the information corresponding to the specified UE category, adding one or more new information elements (IEs), wherein the one or more new IEs carry the information corresponding to the specified UE category, configuring a different value range for one or more existing data fields of the legacy MIB, configuring an MIB message type flag to indicate a new dedicated MIB transmission, or a combination thereof.

Aspect 35: The method of either of aspects 33 or 34, wherein the specified UE category comprises a reduced capability UE device type.

Aspect 36: The method of aspect 33, wherein the dedicated MIB comprises a new MIB defined in a specification and an MIB message type flag indicating the transmission of the new MIB.

Aspect 37: The method of any of aspects 33-36, wherein the dedicated SIB1 comprises a legacy SIB1 modified by: using one or more previously unused bits to carry information corresponding to a specified UE category, adding one or more new data fields, wherein the one or more new data fields carry information corresponding to the specified UE category, adding one or more new information elements (IEs), wherein the one or more new IEs carry information corresponding to a specified UE category, configuring a different value range for one or more existing data fields of the legacy SIB1, configuring a SIB1 message type flag to indicate a new dedicated SIB1 transmission, or a combination thereof.

Aspect 38: The method of aspect 37, wherein the specified UE category comprises a reduced capability UE device type.

Aspect 39: The method of any of aspects 33-36, wherein the dedicated SIB1 comprises a new SIB1 defined in a specification and a SIB1 message type flag indicating the transmission of the new SIB1.

Aspect 40: The method of any of aspects 33-39, wherein the information corresponding to the specified UE category comprises at least one of: an indication of at least one of a repetition pattern or a frequency hopping pattern for repeating transmissions to the UE, an SIB transmission window configuration including at least one of a periodicity or a time offset relative to a system frame number (SFN), an index to a control resource set lookup table, a SIB message type flag indicating transmission of a new SIB for a specified UE category, or a combination thereof.

Aspect 41: The method of any of aspects 33-40, wherein the indication of scheduling information for dedicated on-demand SI is carried in at least one of: an augmented SIB1 information element (IE) configured to carry SI scheduling information, a dedicated IE, wherein the dedicated IE is mapped to at least one of a SIB1, a dedicated SIB1, or a combination thereof, or a combination thereof.

Aspect 42: The method of aspect 41, wherein a mapping of the dedicated IE to the SIB1, the dedicated SIB1, or the combination thereof is established based at least in part on a priority associated with the dedicated on-demand SI.

Aspect 43: The method of any of aspects 32-42, wherein the on-demand SI request is carried in a request message of a two-step RACH procedure.

Aspect 44: The method of aspect 43, wherein the on-demand SI request is carried in at least one of: a preamble of a request message of the two-step RACH procedure, a payload of a request message of the two-step RACH procedure, or a combination thereof.

Aspect 45: The method of any of aspects 32-44, wherein the on-demand SI request is indicated using one or more dedicated parameters defined, in a specification, for the two-step RACH procedure.

Aspect 46: The method of any of aspects 32-45, wherein the on-demand SI request comprises an indication of at least one of a UE use case, a UE capability, or a combination thereof.

Aspect 47: The method of any of aspects 32-46, wherein the on-demand SI request is received via a set of resources, wherein the set of resources is configured based at least in part on: dedicated time resources for a RACH occasion (RO), dedicated frequency resources for the RO, dedicated code resources for the RO, dedicated time resources for a physical uplink shared channel (PUSCH) occasion (PO), dedicated frequency resources for the PO, dedicated code resources for the PO, or a combination thereof.

Aspect 48: The method of any of aspects 32-47, wherein the on-demand SI request is received via a set of resources, wherein the set of resources is configured based at least in part on one or more dedicated synchronization signal block (SSB) to RACH occasion (RO) association patterns.

Aspect 49: The method of any of aspects 32-48, wherein the on-demand SI request is received via a dedicated medium access control (MAC) control element (CE) defined by a specification.

Aspect 50: The method of aspect 49, wherein the on-demand SI request comprises a bitmap that includes a bit corresponding to each dedicated on-demand SIB of the set of dedicated on-demand SIBs, wherein the bit corresponding to each dedicated on-demand SIB indicates whether the corresponding on-demand SIB is to be included in a response to the on-demand SI request or not to be included in the response.

Aspect 51: The method of aspect 50, wherein the bitmap is defined as a new MAC-CE for transmission via the payload of the request message of a two-step RACH procedure.

Aspect 52: The method of aspect 51, wherein the UE transmits the on-demand SI request by multiplexing the new MAC-CE with at least one of a common control channel (CCCH) message, an additional MAC-CE, or a combination thereof.

Aspect 53: The method of any of aspects 49-52, wherein the on-demand SI request indicates a set of indices corresponding to either: a subset of the set of dedicated on-demand SIBs that is to be included in a response to the on-demand SI request, or a subset of the set of dedicated on-demand SIBs that is not to be included in a response to the on-demand SI request.

Aspect 54: The method of any of aspects 32-53, wherein the on-demand SI request is received via uplink control information (UCI).

Aspect 55: The method of aspect 54, wherein the UE transmits the on-demand SI request by piggybacking the UCI on a physical uplink shared channel (PUSCH) message of the four-step RACH procedure.

Aspect 56: The method of aspect 54, wherein the UE transmits the on-demand SI request by piggybacking the UCI on a physical uplink shared channel (PUSCH) portion of a request message of the two-step RACH procedure.

Aspect 57: The method of aspect 54, wherein the UE transmits the on-demand SI request by transmitting the UCI using a physical uplink control channel (PUCCH), wherein the on-demand SI request is multiplexed with a hybrid automatic repeat request acknowledgement (HARQ-ACK) that is transmitted based at least in part on the contention resolution message of the four-step RACH procedure.

Aspect 58: The method of aspect 54, wherein the UE transmits the on-demand SI request by transmitting the UCI using a physical uplink control channel (PUCCH), wherein the on-demand SI request is multiplexed with a hybrid automatic repeat request acknowledgement (HARQ-ACK) that is transmitted based at least in part on the response message of the two-step RACH procedure.

Aspect 59: The method of aspect 54, wherein the UE transmits the on-demand SI request by transmitting the UCI using a physical uplink control channel (PUCCH), wherein the on-demand SI request is multiplexed with at least one of a scheduling request, a channel state information report, or a combination thereof.

Aspect 60: The method of any of aspects 32-59, wherein the on-demand SI request identifies the one or more on-demand SIBs, and wherein transmitting the one or more on-demand dedicated SIBs comprises transmitting a unicast transmission based at least in part on the on-demand SI request.

Aspect 61: The method of any of aspects 32-59, wherein the on-demand SI request identifies a subset of the set of dedicated on-demand SIBs, and wherein transmitting the one or more on-demand dedicated SIBs comprises transmitting a groupcast transmission based at least in part on the on-demand SI request and an additional on-demand SI request from an additional UE.

Aspect 62: The method of any of aspects 32-59, wherein the on-demand SI request identifies a UE category associated with the UE, and wherein transmitting the one or more on-demand dedicated SIBs comprises transmitting a groupcast transmission based at least in part on the on-demand SI request and an additional on-demand SI request from an additional UE, wherein the additional on-demand SI request indicates that the UE category is associated with the additional UE.

Aspect 63: An apparatus for wireless communication at a device, comprising a processor; memory coupled with the processor; and instructions stored in the memory and executable by the processor to cause the apparatus to perform the method of one or more aspects of aspects 1-31.

Aspect 64: A device for wireless communication, comprising a memory and one or more processors coupled to the memory, the memory and the one or more processors configured to perform the method of one or more aspects of aspects 1-31.

Aspect 65: An apparatus for wireless communication, comprising at least one means for performing the method of one or more aspects of aspects 1-31.

Aspect 66: A non-transitory computer-readable medium storing code for wireless communication, the code comprising instructions executable by a processor to perform the method of one or more aspects of aspects 1-31.

Aspect 67: A non-transitory computer-readable medium storing a set of instructions for wireless communication, the set of instructions comprising one or more instructions that, when executed by one or more processors of a device, cause the device to perform the method of one or more aspects of aspects 1-31.

Aspect 68: An apparatus for wireless communication at a device, comprising a processor; memory coupled with the processor; and instructions stored in the memory and executable by the processor to cause the apparatus to perform the method of one or more aspects of aspects 32-62.

Aspect 69: A device for wireless communication, comprising a memory and one or more processors coupled to the memory, the memory and the one or more processors configured to perform the method of one or more aspects of aspects 32-62.

Aspect 70: An apparatus for wireless communication, comprising at least one means for performing the method of one or more aspects of aspects 32-62.

Aspect 71: A non-transitory computer-readable medium storing code for wireless communication, the code comprising instructions executable by a processor to perform the method of one or more aspects of aspects 32-62.

Aspect 72: A non-transitory computer-readable medium storing a set of instructions for wireless communication, the set of instructions comprising one or more instructions that, when executed by one or more processors of a device, cause the device to perform the method of one or more aspects of aspects 32-62.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors coupled to the memory, the memory and the one or more processors configured to:
   receive, from a base station, an indication of scheduling information for dedicated on-demand system information (SI), wherein the dedicated on-demand system information comprises information corresponding to a specified UE category, wherein the indication is carried in at least one of:
      a minimum system information (MSI) communication,
      a radio resource control (RRC) message,
      a response message of a two-step random access channel (RACH) procedure,
      a random access response (RAR) message of a four-step RACH procedure,
      a contention resolution message of a four-step RACH procedure,
      a message type flag indicating a transmission of the dedicated on-demand SI, or
      a combination thereof;
   transmit, to the base station, an on-demand SI request based at least in part on the scheduling information and the specified UE category; and
   receive, from the base station and based at least in part on the on-demand SI request, one or more on-demand system information blocks (SIBs) of a set of dedicated on-demand SIBs.

2. The UE of claim 1, wherein the specified UE category comprises a reduced capability UE device type, and wherein the MSI communication comprises:
   a legacy master information block (MIB),
   a dedicated MIB, wherein the dedicated MIB comprises information corresponding to the specified UE category,
   a legacy system information block 1 (SIB1),
   a dedicated SIB1, wherein the dedicated SIB1 comprises information corresponding to the specified UE category, or
   a combination thereof.

3. The UE of claim 2, wherein the dedicated MIB comprises a legacy MIB modified by:
   using one or more previously unused bits to carry the information corresponding to the specified UE category,
   adding one or more new data fields, wherein the one or more new data fields carry the information corresponding to the specified UE category,
   adding one or more new information elements (IEs), wherein the one or more new IEs carry the information corresponding to the specified UE category,
   configuring a different value range for one or more existing data fields of the legacy MIB,
   configuring an MIB message type flag to indicate a new dedicated MIB transmission, or
   a combination thereof.

4. The UE of claim 2, wherein the dedicated MIB comprises a new MIB defined in a specification and an MIB message type flag that is multiplexed with contents of the new MIB.

5. The UE of claim 2, wherein the dedicated SIB1 comprises a legacy SIB1 modified by:
   using one or more previously unused bits to carry information corresponding to a specified UE category, wherein the specified UE category comprises a group of new UE capabilities specified for a reduced capability UE device type,
   adding one or more new data fields, wherein the one or more new data fields carry information corresponding to the specified UE category, adding one or more new information elements (IEs), wherein the one or more new IEs carry information corresponding to a specified UE category, configuring a different value range for one or more existing data fields of the legacy SIB1, configuring a SIB1 message type flag to indicate a new dedicated SIB1 transmission, or a combination thereof.

6. The UE of claim 2, wherein the dedicated SIB1 comprises a new SIB1 defined in a specification and a SIB1 message type flag that is multiplexed with contents of the new SIB1.

7. The UE of claim 2, wherein the information corresponding to the specified UE category comprises at least one of:

an indication of at least one of a repetition pattern or a frequency hopping pattern for repeating transmissions to the UE, a SIB transmission window configuration including at least one of a periodicity or a time offset relative to a system frame number (SFN), an index to a control resource set lookup table, a SIB message type flag indicating transmission of a new SIB for a specified UE category, or a combination thereof.

8. The mapping of claim 2, wherein the indication of scheduling information for dedicated on-demand SI is carried in at least one of:

an augmented SIB1 information element (IE) configured to carry SI scheduling information, a dedicated IE, wherein the dedicated IE is mapped, by a mapping, to at least one of a SIB1, a dedicated SIB1, or a combination thereof, wherein the mapping is established based at least in part on a priority associated with the dedicated on-demand SI, or a combination thereof.

9. The UE of claim 1, wherein the on-demand SI request is carried in at least one of:

a preamble of a request message of a two-step RACH procedure, a payload of a request message of a two-step RACH procedure, or a combination thereof.

10. The UE of claim 9, wherein the on-demand SI request is indicated using one or more dedicated parameters defined, in a specification, for the two-step RACH procedure.

11. The UE of claim 1, wherein the on-demand SI request comprises an indication of at least one of a UE use case, a UE capability, or a combination thereof.

12. The UE of claim 1, wherein the on-demand SI request is transmitted using a set of resources, wherein the set of resources is configured based at least in part on:

dedicated time resources for a RACH occasion (RO), dedicated frequency resources for the RO, dedicated code resources for the RO, dedicated time resources for a physical uplink shared channel (PUSCH) occasion (PO), dedicated frequency resources for the PO, dedicated code resources for the PO, or a combination thereof.

13. The UE of claim 1, wherein the on-demand SI request is transmitted using a set of resources, wherein the set of resources is configured based at least in part on one or more dedicated synchronization signal block (SSB) to RACH occasion (RO) association patterns.

14. The UE of claim 1, wherein the on-demand SI request is transmitted using a dedicated medium access control (MAC) control element (CE) defined by a specification.

15. The UE of claim 14, wherein the on-demand SI request comprises a bitmap that includes a bit corresponding to each dedicated on-demand SIB of the set of dedicated on-demand SIBs, wherein the bit corresponding to each dedicated on-demand SIB indicates whether the corresponding on-demand SIB is to be included in a response to the on-demand SI request or not to be included in the response.

16. The UE of claim 15, wherein the bitmap is defined as a new MAC-CE for transmission via a payload of a request message of the two-step RACH procedure.

17. The UE of claim 16, wherein the memory and the one or more processors, when transmitting the on-demand SI request, are configured to multiplex the new MAC-CE with at least one of a common control channel (CCCH) message, an additional MAC-CE, or a combination thereof.

18. The UE of claim 14, wherein the on-demand SI request indicates a set of indices corresponding to either:

a subset of the set of dedicated on-demand SIBs that is to be included in a response to the on-demand SI request, or a subset of the set of dedicated on-demand SIBs that is not to be included in a response to the on-demand SI request.

19. The UE of claim 1, wherein the on-demand SI request is transmitted using uplink control information (UCI), and wherein the memory and the one or more processors, when transmitting the on-demand SI request, are configured to piggyback the UCI on a physical uplink shared channel (PUSCH) message of the four-step RACH procedure.

20. The UE of claim 1, wherein the on-demand SI request is transmitted using uplink control information (UCI), and wherein the memory and the one or more processors, when transmitting the on-demand SI request, are configured to piggyback the UCI on a physical uplink shared channel (PUSCH) portion of a request message of the two-step RACH procedure.

21. The UE of claim 1, wherein the on-demand SI request is transmitted using uplink control information (UCI), and wherein the memory and the one or more processors, when transmitting the on-demand SI request, are configured to transmit the UCI using a physical uplink control channel (PUCCH), wherein the on-demand SI request is multiplexed with a hybrid automatic repeat request acknowledgement (HARQ-ACK) that is transmitted based at least in part on the contention resolution message of the four-step RACH procedure.

22. The UE of claim 1, wherein the on-demand SI request is transmitted using uplink control information (UCI), and wherein the memory and the one or more processors, when transmitting the on-demand SI request, are configured to transmit the UCI using a physical uplink control channel (PUCCH), wherein the on-demand SI request is multiplexed with a hybrid automatic repeat request acknowledgement (HARQ-ACK) that is transmitted based at least in part on the response message of the two-step RACH procedure.

23. The UE of claim 1, wherein the on-demand SI request is transmitted using uplink control information (UCI), and wherein the memory and the one or more processors, when transmitting the on-demand SI request, are configured to transmit the UCI using a physical uplink control channel (PUCCH), wherein the on-demand SI request is multiplexed with at least one of a scheduling request, a channel state information report, or a combination thereof.

24. The UE of claim 1, wherein the on-demand SI request identifies the one or more on-demand SIBs, and wherein the memory and the one or more processors, when receiving the one or more on-demand dedicated SIBs, are configured to receive a unicast transmission based at least in part on the on-demand SI request.

25. The UE of claim 1, wherein the on-demand SI request identifies a subset of the set of dedicated on-demand SIBs, and wherein the memory and the one or more processors, when receiving the one or more on-demand dedicated SIBs, are configured to receive a groupcast transmission based at least in part on the on-demand SI request and an additional on-demand SI request from an additional UE.

26. The UE of claim 1, wherein the on-demand SI request identifies a UE category associated with the UE, and wherein the memory and the one or more processors, when receiving the one or more on-demand dedicated SIBs, are configured to receive a groupcast transmission based at least in part on the on-demand SI request and an additional on-demand SI request from an additional UE, wherein the additional on-demand SI request indicates that the UE category is associated with the additional UE.

27. A base station for wireless communication, comprising:
a memory; and
one or more processors coupled to the memory, the memory and the one or more processors configured to:
transmit, to a user equipment (UE), an indication of scheduling information for dedicated on-demand system information (SI), wherein the dedicated on-demand system information comprises information corresponding to a specified UE category, wherein the indication is carried in at least one of:
a minimum system information (MSI) communication,
a radio resource control (RRC) message,
a response message of a two-step random access channel (RACH) procedure,
a random access response (RAR) message of a four-step RACH procedure,
a contention resolution message of a four-step RACH procedure,
a message type flag indicating a transmission of the dedicated on-demand SI, or
a combination thereof;
receive, from the UE, an on-demand SI request based at least in part on the scheduling information; and
transmit, to the UE and based at least in part on the on-demand SI request, one or more on-demand system information blocks (SIBs) of a set of dedicated on-demand SIBs.

28. The base station of claim 27, wherein the on-demand SI request identifies the one or more on-demand SIBs, and wherein the memory and the one or more processors, when transmitting the one or more on-demand dedicated SIBs, are configured to transmit a unicast transmission based at least in part on the on-demand SI request.

29. The base station of claim 27, wherein the on-demand SI request identifies a subset of the set of dedicated on-demand SIBs, and wherein the memory and the one or more processors, when transmitting the one or more on-demand dedicated SIBs, are configured to transmit a groupcast transmission based at least in part on the on-demand SI request and an additional on-demand SI request from an additional UE.

30. The base station of claim 27, wherein the on-demand SI request identifies a UE category associated with the UE, and wherein the memory and the one or more processors, when transmitting the one or more on-demand dedicated SIBs, are configured to transmit a groupcast transmission based at least in part on the on-demand SI request and an additional on-demand SI request from an additional UE, wherein the additional on-demand SI request indicates that the UE category is associated with the additional UE.

* * * * *